(12) United States Patent
Lee

(10) Patent No.: US 11,623,966 B2
(45) Date of Patent: Apr. 11, 2023

(54) SYSTEM AND METHOD FOR IMPROVING THE CORN WET MILL AND DRY MILL PROCESS

(71) Applicant: Lee Tech LLC, Los Gatos, CA (US)

(72) Inventor: Chie Ying Lee, Los Gatos, CA (US)

(73) Assignee: Lee Tech LLC, Los Gatos, CA (US)

( * ) Notice: Subject to any disclaimer, the term of this patent is extended or adjusted under 35 U.S.C. 154(b) by 0 days.

(21) Appl. No.: 17/581,434

(22) Filed: Jan. 21, 2022

(65) Prior Publication Data

US 2022/0235150 A1     Jul. 28, 2022

Related U.S. Application Data

(60) Provisional application No. 63/140,342, filed on Jan. 22, 2021.

(51) Int. Cl.
*C13K 13/00*     (2006.01)
*C08B 30/04*     (2006.01)
(Continued)

(52) U.S. Cl.
CPC ............ *C08B 30/044* (2013.01); *C08B 30/02* (2013.01); *C08B 30/06* (2013.01)

(58) Field of Classification Search
CPC ........ C08B 30/044; C08B 30/02; C08B 30/06
(Continued)

(56) References Cited

U.S. PATENT DOCUMENTS

| 1,942,943 A | 1/1934 | Schnabel |
| 2,190,176 A | 2/1940 | Smith |

(Continued)

FOREIGN PATENT DOCUMENTS

| AU | 2013200519 B2 | 2/2013 |
| CN | 1883299 A | 12/2006 |

(Continued)

OTHER PUBLICATIONS

"Organic" organic.org; published Dec. 25, 2012, accessed on Mar. 3, 2017, available at htt://web.archive.org/web/20121225201858/http://www.organic.org/home /faq.

(Continued)

*Primary Examiner* — Brent T O'Hern
(74) *Attorney, Agent, or Firm* — Haverstock & Owens, A Law Corporation

(57) ABSTRACT

A novel dry mill process for producing pure starch, which can be used as a feed stock for bio tech processes. Corn feedstock is sent through a particle size reduction device, such as a hammer mill, to produce corn flour. The corn flour is screened into a small particle portion (which mainly contains "free" starch from the floury endosperm) and a larger particle portion (which mainly comprises the horny endosperm, germ pericarp and tip cap). The small particle potion is sent to a liquefication and a saccharification process to produce high Be corn syrup. A mud phase (mixture of oil, germ, and any light solid) is centrifuged. The light phase is sent to precoat drum filtration to produce clean corn syrup. Further, a novel wet mill process to produce starch and alcohol is disclosed. A three-section paddle screen can be used to separate starch from grit and fiber.

19 Claims, 17 Drawing Sheets

(51) Int. Cl.
*C08B 30/06* (2006.01)
*C08B 30/02* (2006.01)

(58) Field of Classification Search
USPC .......................................................... 127/67
See application file for complete search history.

(56) References Cited

U.S. PATENT DOCUMENTS

| | | |
|---|---|---|
| 2,313,275 A | 3/1943 | Schopmeyer |
| 2,600,903 A | 6/1952 | Miller |
| 2,967,107 A | 1/1961 | Geiger et al. |
| 3,054,676 A | 9/1962 | Lauhoff et al. |
| 3,058,887 A | 10/1962 | Platt et al. |
| 3,753,723 A | 8/1973 | Henderson |
| 3,786,078 A | 1/1974 | Smith et al. |
| 3,827,423 A | 8/1974 | Bolitho |
| 3,973,043 A | 8/1976 | Lynn |
| 3,975,546 A | 8/1976 | Stahmann |
| 4,042,172 A | 8/1977 | Norzdrovsky |
| 4,130,553 A | 12/1978 | Batley, Jr. |
| 4,171,383 A | 10/1979 | Chwalek et al. |
| 4,255,518 A | 3/1981 | Muller et al. |
| 4,313,061 A | 1/1982 | Thomas |
| 4,333,871 A | 6/1982 | De Jong |
| 4,341,713 A | 7/1982 | Stolp et al. |
| 4,361,651 A | 11/1982 | Keim |
| 4,396,161 A | 8/1983 | Roukolainen et al. |
| 4,517,022 A | 5/1985 | Harvey |
| 4,635,864 A | 1/1987 | Peterson et al. |
| 4,772,481 A | 9/1988 | Rohwer |
| 4,835,100 A | 5/1989 | Dixon |
| 4,857,325 A | 8/1989 | Albeck |
| 4,978,618 A | 12/1990 | Kalina |
| 5,177,008 A | 1/1993 | Kampen |
| 5,244,159 A | 9/1993 | Newman |
| 5,248,099 A | 9/1993 | Lahner et al. |
| 5,294,434 A | 3/1994 | King |
| 5,364,335 A | 9/1994 | Franzen et al. |
| 5,475,099 A | 12/1995 | Knauf |
| 5,516,974 A | 5/1996 | Sasae |
| 5,994,113 A | 11/1999 | Kauppinen et al. |
| 6,080,401 A | 6/2000 | Reddy |
| 6,190,462 B1 | 2/2001 | Markland et al. |
| 6,254,914 B1 | 7/2001 | Singh et al. |
| 6,274,358 B1 | 8/2001 | Holtz et al. |
| 6,899,910 B2 | 5/2005 | Johnston et al. |
| 7,297,236 B1 | 11/2007 | Vander Griend |
| 7,563,469 B1 | 7/2009 | Navarro et al. |
| 7,687,648 B2 | 3/2010 | Smallridge et al. |
| 7,700,094 B1 | 4/2010 | Nsereko |
| 7,858,140 B2 | 12/2010 | Paustian et al. |
| 9,012,191 B2 | 4/2015 | Lee |
| 9,352,326 B2 | 5/2016 | Lee |
| 9,388,475 B2 | 7/2016 | Lee |
| 9,695,381 B2 | 7/2017 | Lee |
| 9,777,303 B2 | 10/2017 | Jakel et al. |
| 10,190,086 B2 | 1/2019 | Narendranath et al. |
| 2001/0014360 A1 | 8/2001 | Paluch |
| 2002/0122944 A1 | 9/2002 | Ogle et al. |
| 2004/0009160 A1 | 1/2004 | Villamar |
| 2004/0071757 A1 | 4/2004 | Rolf |
| 2004/0087808 A1 | 5/2004 | Prevost et al. |
| 2004/0187863 A1 | 9/2004 | Langhauser |
| 2004/0258782 A1 | 12/2004 | Hoffman et al. |
| 2005/0009133 A1 | 1/2005 | Johnston et al. |
| 2005/0028810 A1 | 2/2005 | Lee |
| 2005/0100996 A1 | 5/2005 | Lantero, Jr. et al. |
| 2005/0170067 A1 | 8/2005 | Shao et al. |
| 2005/0249837 A1 | 11/2005 | Massimio et al. |
| 2005/0281792 A1 | 12/2005 | Short |
| 2006/0127453 A1 | 6/2006 | Harel |
| 2006/0154353 A1 | 7/2006 | Duan |
| 2006/0292677 A1 | 12/2006 | Ostrander |
| 2007/0066476 A1 | 3/2007 | Ullmann |
| 2007/0148318 A1 | 6/2007 | Rubio et al. |
| 2007/0184159 A1 | 8/2007 | Shima et al. |
| 2007/0184541 A1 | 8/2007 | Karl et al. |
| 2007/0210007 A1 | 9/2007 | Scheimann et al. |
| 2007/0231311 A1 | 10/2007 | Kroening |
| 2008/0095881 A1 | 4/2008 | Ber |
| 2008/0210541 A1 | 9/2008 | Wenger et al. |
| 2008/0279983 A1 | 11/2008 | Lohrmann et al. |
| 2009/0029432 A1 | 1/2009 | Abbas et al. |
| 2009/0093027 A1 | 4/2009 | Balan et al. |
| 2009/0061490 A1 | 5/2009 | Edwards et al. |
| 2009/0181153 A1 | 7/2009 | Bendorf et al. |
| 2009/0227004 A1 | 9/2009 | Dale |
| 2010/0028484 A1 | 2/2010 | Kriesler et al. |
| 2010/0082312 A1 | 4/2010 | Macharia |
| 2010/0093860 A1 | 4/2010 | Boon et al. |
| 2010/0120128 A1 | 5/2010 | Liang |
| 2010/0159547 A1 | 6/2010 | Falcounbridge |
| 2010/0159552 A1 | 6/2010 | Benson et al. |
| 2010/0196994 A1 | 8/2010 | Van Leeuwen et al. |
| 2010/0260918 A1 | 10/2010 | Wang |
| 2010/0324274 A1 | 12/2010 | DeFrees |
| 2011/0086149 A1 | 4/2011 | Bootsma |
| 2011/0100359 A1 | 5/2011 | North |
| 2011/0106277 A1 | 5/2011 | Sayyar-Rodsari |
| 2011/0123657 A1 | 5/2011 | Vandenbroucke et al. |
| 2011/0150853 A1 | 6/2011 | Mann et al. |
| 2011/0177560 A1 | 7/2011 | Galvez, III et al. |
| 2011/0223307 A1 | 9/2011 | Bertoldo de Barros et al. |
| 2011/0250310 A1 | 10/2011 | Mateus |
| 2011/0250312 A1 | 10/2011 | Lewis |
| 2011/0269185 A1 | 11/2011 | David |
| 2011/0283602 A1 | 11/2011 | Gallop et al. |
| 2011/0315541 A1 | 12/2011 | Xu |
| 2012/0048716 A1 | 3/2012 | Sonnek |
| 2012/0077232 A1 | 3/2012 | Budaraju et al. |
| 2012/0077244 A1 | 3/2012 | Budaraju et al. |
| 2012/0107454 A1 | 5/2012 | Hoffman et al. |
| 2012/0125859 A1 | 5/2012 | Collins |
| 2012/0168387 A1 | 7/2012 | Tran et al. |
| 2012/0183643 A1 | 7/2012 | Dale |
| 2012/0199531 A1 | 8/2012 | Winsness |
| 2012/0244590 A1 | 9/2012 | Lee |
| 2012/0245123 A1 | 9/2012 | Lopez Pedrosa et al. |
| 2012/0252065 A1 | 10/2012 | Rozenszain et al. |
| 2012/0270275 A1 | 10/2012 | Fenton et al. |
| 2013/0121891 A1 | 5/2013 | Dieker |
| 2013/0130343 A1 | 5/2013 | Purtle et al. |
| 2013/0224333 A1 | 8/2013 | Nanjundaswamy et al. |
| 2013/0236936 A1 | 9/2013 | Lee |
| 2013/0288376 A1 | 10/2013 | Lee |
| 2013/0206342 A1 | 11/2013 | Dahmes |
| 2013/0316041 A1 | 11/2013 | Maranz |
| 2013/0337517 A1 | 12/2013 | Razavi-Shirazi |
| 2013/0344045 A1 | 12/2013 | Faure |
| 2014/0004571 A1 | 1/2014 | Garrett |
| 2014/0053829 A1* | 2/2014 | Lee ............... A23K 10/38 554/8 |
| 2014/0102950 A1 | 4/2014 | Bethke |
| 2014/0186868 A1 | 7/2014 | Siegert |
| 2014/0206055 A1 | 7/2014 | Ramos |
| 2014/0242251 A1 | 8/2014 | Bootsma |
| 2014/0273140 A1 | 9/2014 | Langhouser |
| 2014/0319066 A1 | 10/2014 | LoCascio |
| 2014/0343254 A1 | 11/2014 | Gerardi |
| 2015/0152372 A1 | 6/2015 | Kohl |
| 2015/0176034 A1 | 6/2015 | Ramos |
| 2015/0223493 A1 | 8/2015 | Lee |
| 2015/0231535 A1 | 8/2015 | Lee et al. |
| 2015/0240266 A1 | 8/2015 | Lee |
| 2015/0307822 A1 | 10/2015 | Rossell et al. |
| 2016/0060658 A1 | 3/2016 | Lee |
| 2016/0222135 A1* | 8/2016 | Lee ............... C12P 7/16 |
| 2016/0374364 A1 | 12/2016 | Lee |
| 2017/0058300 A1 | 3/2017 | Aurandt |
| 2018/0225669 A1 | 8/2018 | Brotherson |
| 2018/0343891 A1 | 12/2018 | Lee |
| 2019/0017080 A1 | 1/2019 | Bootsma |
| 2019/0119711 A1 | 4/2019 | Lee |

(56) References Cited

U.S. PATENT DOCUMENTS

| | | | |
|---|---|---|---|
| 2019/0241834 | A1 | 8/2019 | Lee |
| 2021/0024964 | A1 | 1/2021 | Lee |
| 2021/0059277 | A1 | 3/2021 | Lee |

FOREIGN PATENT DOCUMENTS

| | | | |
|---|---|---|---|
| CN | 1966706 | A | 5/2007 |
| CN | 101080483 | A | 11/2007 |
| CN | 101453884 | A | 8/2009 |
| CN | 101621935 | A | 1/2010 |
| CN | 101795578 | A | 8/2010 |
| CN | 104703957 | A | 6/2015 |
| DE | 4239342 | A1 | 5/1994 |
| EP | 0772978 | B1 | 11/1991 |
| GB | 511525 | A | 8/1939 |
| GB | 852995 | A | 11/1960 |
| WO | 01/14595 | A2 | 3/2001 |
| WO | 2012075481 | A1 | 6/2012 |
| WO | 2012145230 | A1 | 10/2012 |
| WO | 2012160191 | A2 | 11/2012 |
| WO | 2012166290 | A1 | 12/2012 |
| WO | 2013034747 | A1 | 3/2013 |
| WO | 2014031700 | A2 | 2/2014 |
| WO | 20140127852 | A2 | 8/2014 |
| WO | 2016033548 | A1 | 3/2016 |

OTHER PUBLICATIONS

Alfagreen supreme: available at:https://web.archive.org/web/2012120705040902/thttp://www.alfagreensupreme.com.purproducts:html;published Jul. 12, 2012, accessed on Mar. 6, 2017.

Egg, whole,raw, fresh form composition of Foods Raw, Processed, Prepared , USDA National Nutrient Database for Standard Reference, Release 22, Sep. 2009,; available at :http:// www.ars.usda.gov/northweast-area/beltsville-human-nutrition-research-center/nutrient-data-laboratory/docs/sr22-download-files/: access on Oct. 17, 2017.

Swiss chard, What's New and Beneficial About Swiss Chard: The World's Healthiest Foods; available at : http://web.archive.org/web/20130117060212/http://www.whfoods.com/genpage.php?tname=foodspice&dbid=16;published on Jan. 17, 2013: accessed on Oct. 19, 20174.

Singh et al., Effect of Corn Oil on Thin Stillage Evaporators,Cereal Chemistry, pp. 846-849, 1999.

Blog, Birdworms & Buttermilk, Extracting Chlorophyll from Leafy Greens; available at: http://birdworms.com/2010/06/26/extractingchlorophyllfromleafygreens/; accessed on Oct. 6, 2016; published on Jun. 2010.

Gonzalez-Martin, Use of NIRS technology with a remote reflectance fibre-optic probe for predicting mineral composition(Ca, K, P, Fe, Mn, Na, Zn), protein and moisture in alfalfa; Anal Bioanal Chem (2007) 387:2199-2205.

What Are Enzymes?: published Mar. 7, 2013; available at: https://web.archive.org./webs/20130307025120/hrrp://www.enzyme-facts.com/enzymes.html; accessed on Aug. 11, 2017.

"Hydrocarbon." In The Columbia Encyclopedia, by Paul Lagasse, and Columbia University. 7th ed. Columbia University Press, 2017. http://search.credoreference.com/content/entry/columency/hydrocarbon/0?institutionId=743.

"Starch ." In The American Heritage (R) Dictionary of the English Language, edited by The Editors of the American Heritage Dictionaries. 5th ed. Houghton Mifflin, 2011. http://search.credoreference.com/content/entry/hmdictenglang/starch/0?institutionId=743.

Kung, A review on silage additives and enzymes, Proceeding of the 59th Minneapolis Nutrition Conference, Sep. 1998; p. 121-135.

Heist, A Guide to Successful Yeast Propagatiion, Ethanol Producer Magazine, 2008.

Dotty 1, New natural medical antibiotic; Chlorophyll & Spinach, available at http://www.acne.org/messageboard/topic/254668-new-natural-medical-antibiotic-chlorophyllspinach/; published Nov. 30, 2009; accessed on Jul. 3, 2017.

Spinach, vol. 1, No. 14, University of the District of Columbia, Center for Nutrition, Diet and Health, published Jan. 23, 2014, accessed on Jul. 30, 2017, available at : https://web.archive.org/web/20140123214335/https://www.udc.edu/docs/causes/online/Spinach%2014.pdf.

Shahina Z. et al., "Variation of Protease Production by the Bacteria (*Bacillus fastidiosus*) and the Fungus (*Aspergillus funiculosus*)", Journal of Microbiology Research [online], 2013 [retrieved on Oct. 17, 2019], vol. 3, issue 4, retrieved from the Internet: <DIO: 10.5923//j.microbiology.2013030402>, pp. 135-142, see entire documents, especially p. 135.

International Search Report from PCT/US16/38436 dated Oct. 31, 2016.

International Search Report dated Dec. 18, 2018, for International Application No. PCT/US18/56340.

Office Action for Canadian Patent Application No. 2,951,715 dated Jul. 9, 2019.

Office Action for Brazilian Patent Application No. BR112015003793-3 dated Jul. 23, 2019.

Office Action dated May 9, 2019 for Canadian Patent Application No. 2,882,173.

Brazilian Office Action for Patent Application No. BR112017016172-9 dated 26, 2019.

Brazilian Office Action for Patent Application No. BR112017027884-7 dated Jan. 2, 2020.

International Preliminary Report form PCT Application No. PCT/US2018/056340, dated Apr. 30, 2020.

Chinese Office Action dated Jun. 3, 2020 for Chinese Patent Application No. 201680007372.4.

GESE Success, Letters Educational, UK, 2006, p. 19 (Year : 2006).

Office Action for the Argentina Patent Application No. 20160101901 dated Aug. 19, 2020.

Brazilian Office Action dated Aug. 8, 2020 for Brazilian Patent Application No. BR112017004017-4.

Office Action from the Canadian Patent Application No. 2,951,715 dated Aug. 28, 2020.

Labedz et al., Precise Mass Determination of Single Cell With Cantilever-Based Microbiosensor System, PLOS One, http//:doi.otg/10.137/journal.pone.018838, Nov. 21, 2017,pp. 1-14.

International Search Report and Written Opinion for the Application No. PCT/US20/55174 dated Mar. 18, 2021.

Xu et al., Continuous ethanol production using self-flocculating yeast in a cascade of fermentors' Enzyme and Microbial Technology 37(2005) 634-640, entire document esp p. 635-636.

https://en.wikipedia.org/windex.php?title=Clean-in-place&oldid=889731953'Clean-inplace' Mar. 27, 2019,entire document esp p. 2.

Best way to keep dog food an treats fresh—Vacuum seal!, vacmasterfresh.com, Aug. 26, 2015[online],[retrieved Feb. 11, 2021]. Retrieved from the Internet<https://www.vacmasterfresh.com/freshbites-blog/best-way-to-keep-dog-food-and-treats-fresh-vacuum-seal>(Year:2015).

The Pelleting Process, California Pellet Mill Co., May 17, 2017[online], [retieved Feb. 11, 2021].Retrieved from the Internet <https://www.cpm.net/downloads/Animal%20 Feed%20Pelleting.pdf>(Year:2017).

Vibrating Fluid Bed Dryers, Carrier Vibrating , May 12, 2017[online],[retrieved Feb. 17, 2021].Retrieved from the Internet<https://www.carriervibrating.com/equipment/dryers/vibrating/>(2017).

Imran M. et al., Role of Enzymes in Animal Nutrition: A Review, PSM Vet. Res., 01(2)(2016):38-45. (Year:2016).

How many different chemical reactions can a single enzyme catalyze?, Truong-Son-N, Jan. 3, 2016[online], [retrieved Mar. 4, 2021]. Retrieved from the Internet <https://socratic.org/questions/jo-many-different-chemical-reactions-can-a single-enzymed-catalyze>(Year:2016).

International Search Report and Written Opinion for the International Application No. PCT/US2020/057558 dated Jan. 27, 2021.

Office Action for the Chinese Application No. 201680007372.4 dated Feb. 22, 2021.

Office Action for the Brazilian Patent Application No. BR 11 2015 003793-3 Feb. 2, 2021.

Office Action dated Dec. 4, 2020, for Chinese Patent Application No. 201680003607.2.

(56) References Cited

OTHER PUBLICATIONS

International Search Report and Written Opinion of the International Search Authority dated Apr. 11, 2022 for International Application No. PCT/US 2022/13332, 16 pages.
International Preliminary Report on Patentability dated Apr. 21, 2022 for International Application No. PCT/US2020/055174, 9 pages.
International Preliminary Report dated May 12, 2022 for the International Application No. PCT/US2020/057558.

* cited by examiner

SYSTEM AND METHOD FOR IMPROVING THE CORN WET MILL AND DRY MILL PROCESS

CROSS-REFERENCE TO RELATED APPLICATION(S)

The present invention claims priority to the U.S. provisional patent application Ser. No. 63/140,342, titled "System and Method for Improving the Corn Wet Mill and Dry Mill Process," filed on Jan. 22, 2021, which is incorporated by reference in its entirety for all purposes.

FIELD OF THE INVENTION

The present invention relates to dry mill and wet mill processes for producing starch, especially a pure starch slurry. The slurry can be used as a feed stock for a new green technology process using the starch.

BACKGROUND OF THE INVENTION

The corn wet milling process, for the last fifty years, has been used to produce pure starch slurries. These are then converted to corn syrup for human consumption. This low-cost corn syrup has been gradually replacing sugar. There is evidence that over consumption of sugar and starch adversely affect human health. At the same time, the world population has started consuming too much petroleum fuel, generating considerable carbon dioxide, and creating a global warming problem.

Many "green" technology companies have investigated using starch as a feed stock to replace fossil fuel-based hydrocarbons. Over 200 dry mill ethanol plants have been built and produce over 15.8 billion gallons of fuel ethanol in the USA per year. The Dry Mill process represents more than a 2000-year-old technology for converting starch in grain to alcohol. There have been some improvements, but these are only a start. More new "green" technology processes will follow in future, such as the production of butanol from starch.

FIG. 1 illustrates a typical dry mill process 100. A corn supply is fed through a hammer mill (milling) Step 109 to decrease the particle size. The screen size in the hammer mill is normally 5/64 to 9/64 inch. The corn flour produced in hammer mill particle size reduction Step 109 typically contains a very wide particle size distribution in a bell shape range from less than 50 micron to as large as 2 to 3 mm. Milling Step 109 is followed by a liquefaction Step (Steps 101, 102, 103A and 103B) where the ground corn meal is mixed with cook water to create a slurry in a slurry tank Step 101 and an enzyme such as alpha amylase is typically added, followed by a jet cooker Step 102 (optional) to the liquefied starch at higher temperature, if needed. The pH is adjusted here to about 5.0 to 6 and the temperature maintained between about 50° C. to 105° C. to convert the insoluble starch in the slurry to soluble starch in two liquefication tank Steps 103A and 103B.

The stream after the liquefaction Steps 103A and B has about 26 to 38% dry solids (DS) content, with all the components contained in the corn kernels, including sugars, protein, fiber, starch, germ, grit, and oil and salts, for example. There generally are three types of insoluble solid particles in the liquefaction stream: fiber, germ, and grit, with all three solids having about the same particle size distribution.

Liquefaction Steps 103A and B are followed by a simultaneous saccharification and fermentation Step 104. This simultaneous step is referred to in the industry as "Simultaneous Saccharification and Fermentation" (SSF). In some commercial dry grind ethanol processes, saccharification and fermentation occur separately (not shown). Both individual saccharification and SSF can take as long as about 50 to 60 hours. Fermentation converts the sugar to alcohol using a fermenter. Following saccharification and fermentation Step 104 is a distillation (and dehydration) Step 105, which utilizes a still to recover the alcohol produced in Step 104.

Finally, the "back end" of the process 100, which follows distillation (and dehydration) Step 105, includes a centrifugation Step 106 using a decanter. This involves centrifuging the residuals, "whole stillage", produced in distillation Step 104 and dehydration Step 105, to separate the insoluble solids ("wet cake") from the liquid ("thin stillage"). The "wet cake" includes fiber, of which there are three types: (1) pericarp, with average particle sizes typically about 1 mm to 3 mm; (2) tip cap, with average particle sizes about 500 micron; (3) and fine fiber, with average particle sizes of about 250 micron. The liquid from the centrifuge contains about 6% to 8% dry solids (DS).

The thin stillage enters evaporators in an evaporation Step 107 to boil away water. This leaves a thick syrup that contains the soluble (dissolved), fine suspended (generally less than 50 μm) and buoyant suspended solids from fermentation Step 104. This generally amounts to about 25% to 40% dry solids. The concentrated slurry may be subjected to an optional oil recovery step (not shown) where the slurry can be centrifuged to separate oil from the syrup. The oil can be sold as a separate high value product. The oil yield is normally about 0.4 lb./Bu of corn with high free fatty acids content. This oil yield recovers only about ¼ of the oil in the corn. About one-half of the oil inside the corn kernel remains inside the germ after distillation Step 105, and cannot be separated in the typical dry grind process using centrifuges. The free fatty acid content, which is created when the oil is held in the fermenter for approximately 50 hours, reduces the value of the oil. The (de-oil) centrifuge step only removes less than 50% of oil present in thick syrup because the protein and oil make an emulsion, which cannot be satisfactorily separated by centrifugation alone as practiced today.

The centrifuged wet cake and the de-oiled syrup, which still has more than 10% (dry matter concentration) oil, can be mixed and the mixture may be sold to beef and dairy feedlots as Distillers Wet Grain with Soluble (WDGS). Alternatively, the syrup can be mixed with the wet cake, then the concentrated syrup mixture may be dried using drying at a Step 108 and sold as Distillers Dried Grain with Soluble (DDGS) to dairy and beef feedlots. This DDGS has all the protein and 75% of the oil in corn. However, the value of DDGS is low due to the high percentage of fiber, and in some cases, the oil is a hindrance to animal digestion. The % starch in DDGS normal as low as 5 to 6%.

The typical dry mill process also can produce clean sugar solution by a filtration method to remove all the insoluble solids (e.g., fiber and protein) from the liquefied starch solution. However, this clean sugar solution still contains all the soluble solids, such as ash from inside the corn, plus small amounts of corn oil. Many new green technology processes need much purer starch from wet mill processes as feed stock, without oil and soluble solids from inside the corn kernels.

A typical corn kernel 1400 is illustrated in FIG. 14. Kernel 1400 includes a hull 1410, a floury endosperm 1420, a horny endosperm 1430, having cells filled with starch granules in a protein matrix, a germ 1440, and a tip cap 1450. A typical corn composition is illustrated in Table 1, below.

The stream generated in the process disclosed herein has high fiber content (more than 60%) as compared with corn which has 70% starch and 9% fiber, which shows that the majority portion of the starch has been isolated/removed for predetermined uses, such as serving as a feedstock for

TABLE 1

Yellow Dent Corn Composition

Dry basis

|  | % on Kernel | Starch | Protein | Oil | Ash | Sugars | Fiber |
| --- | --- | --- | --- | --- | --- | --- | --- |
| Endosperm | 82.90% | 88.40% | 8% | 0.80% | 0.30% | 0.60% | 1.90% |
| Germ | 11% | 11.90% | 18.40% | 29.60% | 10.50% | 10.80% | 18.80% |
| Pericarp | 5.30% | 7.30% | 3.70% | 1% | 0.80% | 0.30% | 86.90% |
| Tip Cap | 0.80% | 5.30% | 9.10% | 3.80% | 1.60% | 1.60% | 78.60% |
| Whole kernel | 100.00% | 75% | 8.90% | 4% | 1.50% | 1.70% | 8.90% |
| wt. in Lb./Bu | 47 | 35.25 | 4.183 | 1.88 | 0.705 | 0.799 | 4.183 |
| Endosperm | 38.963 | 34.44329 | 3.11704 | 0.311704 | 0.116889 | 0.233778 | 0.740297 |
| Germ | 5.17 | 0.61523 | 0.95128 | 1.53032 | 0.54285 | 0.55836 | 0.97196 |
| Pericarp | 2.491 | 0.181843 | 0.092167 | 0.02491 | 0.019928 | 0.007473 | 2.164679 |
| Tip Cap | 0.376 | 0.019928 | 0.034216 | 0.014288 | 0.006016 | 0.006016 | 0.295536 |
| pericap + tipcap | 2.867 | 0.201771 | 0.126383 | 0.039198 | 0.025944 | 0.013489 | 2.460215 |
| % comp | 100.00% | 7.04% | 4.41% | 1.37% | 0.90% | 0.47% | 85.81% |
| change after fomenter |  | −32.648 | 0.375 |  | 0.4 | 2 |  |
| Total by product | 15.127 | 0.602 | 4.558 | 1.88 | 1.105 | 2.799 | 4.183 |
| % lab analysis | 100 | 3.979639 | 30.13155 | 12.42811 | 7.304819 | 18.50334 | 27.65254 |
| soluble solid | 3.904 |  |  |  | 1.105 | 2.799 |  |
| yeast | 0.83333333 |  | 0.375 |  |  |  | 0.458333 |
| germ | 3.45356 |  | 0.95128 | 1.53032 |  |  | 0.97196 |
| corn protein | 4.169041 |  | 3.11704 | 0.311704 |  |  | 0.740297 |
| pericap + tipcap | 2.827567 | 0.201771 | 0.126383 | 0.039198 |  |  | 2.460215 |
| Total | 15.1875013 | 0.201771 | 4.569703 | 1.881222 | 1.105 | 2.799 | 4.630805 |

SUMMARY OF THE INVENTION

For improvements of the existing wet mill plants:
In view of typical wet mill plants that produce starch for bio tech processes, the disclosure provides a novel wet mill process, such as a process 1100 of FIG. 11. The starch produced using the processes disclosed herein can be used as a feedstock for biotech processes, which has a purity of less than 0.35% protein in the starch slurry. In some other embodiments, a feedstock for biotech processes has a purity of less than 3% protein in the starch slurry. In other embodiments, a feedstock for biotech processes has a purity of protein between 1-5% in the starch slurry. In some embodiments, a feedstock for biotech processes has a purity of less than 5% protein in the starch slurry.

In some embodiments, the disclosure provides a simple and low-cost process in conjunction with a dry mill process (e.g., for alcohol production) to produce pure starch slurry that meets the standard as a feedstock of a biotech process. In other words, the processes disclosed herein can be applied in a dry mill process in some embodiments and can also be used in a wet mill process in some other embodiments.

An improved process in accordance with some embodiments obtains the grit and fiber portion from the degerm process 200 of the FIG. 2 as feed stock to produce fuel alcohol using the resident starch inside. The process 200 in FIG. 2 can be used along with any or some of the selected embodiments disclosed in the Present Disclosure, including the process 1100 in the FIG. 11.

FIG. 11 illustrates an improved wet milling process in accordance with some embodiments, which obtains the grit and fiber which have more than 10% starch inside.

biotech processes. Further, the fiber is removed during the liquefaction step to use this as feed stock for fuel alcohol production. An improved wet mill combination process is shown in the process 1100 of FIG. 11.

A wet mill process of FIG. 10, wherein the corn is sent to a steeping at the process 1600, which is followed by a degerm process 200 of FIG. 10. The process 200 of FIG. 10 can be performed using the process 200 of FIG. 2. Using process 200 in FIGS. 2 and 10 removes germs and produces 12 Be starch slurry with grit and fiber particles as an underflow stream by using a secondary dual degerm cyclone at a germ/grit separating at a Step 206.

In the FIG. 11, an improved three section paddle screen is used for fiber separation and washing (e.g., liquid/solid separation and washing of process 300), which is used to separate free starch (less than 50-micron size particles) from larger particle grit and fiber by using 50-micron screen in a paddle screen particle separator, wherein a three-section screen separator is preferred. The free starch separated at the liquid/solid separation and washing process 300 is sent to a starch/gluten separating process 400, which can be the same or a similar process as illustrated in the process 400 in the FIG. 4. In the starch/gluten separating process 400, a clean liquid from gluten nozzle centrifuge at a Step 402 in the FIG. 4 can be used as washing water to wash off any free starch from grit and fiber solids before emerging as a wet cake from this three-section paddle screen. Three section paddle screen separation and washing apparatuses, which are used in the liquid/solid separation and washing process are described in U.S. Ser. No. 63/131,035, filed Dec. 28, 2020, titled Screening Apparatus, the entire contents of which is incorporated herein by reference for all purposes.

One embodiment of a three section paddle screen separation apparatus (e.g., liquid/solid separation and washing in the process 300 of FIG. 11) includes using a cylindrical container with an upstream inlet for a slurry and a downstream outlet for a wet cake. The walls of the container comprise three sections of screen. The first screen section can include the smallest openings. The container is mounted within a housing, configured to collect the material passing through each of the three different screen sections. Material that does not pass through the screen exits through the outlet. Paddles extend radially from a central axis of the container towards and just short of the inner surface of the screen. The paddles rotate and urge material against the screen. The rotating paddles also help prevent screen plugging. A conduit extends along the central axis as a source of wash water. The wash water can flow counter current with respect to the downstream direction within the container. A central conveyor can help move material in the downstream direction. Thus, the three or more sections can be used to separate differently sized materials from a slurry.

Referring to the output from the process 300 of liquid/solid separation and washing, the wet cake from the process 300 has the option of go through an additional particle size reduction at a Step 1114 of FIG. 11 to break grit particles further before being added to slurry tank at a Step 101. Any particle size reducer such as a grinding mill, pin mill roller mill and other device can be used for the Step 114. From the Step 114, the broken grit particles go through slurry tank at the Step 101, jet cooker at the Step 102, and liquefaction tank at the Step 103 to form liquefied starch. The liquefied starch from the Step 103 can be sent to the Step 701 for particle size separating and washing, which can be like a liquid/solid separation and washing at the Step 701 of the FIG. 7. Like the process 700 in the FIG. 7, the liquefied starch with fiber is fed to a liquid/solid separation and washing step (e.g., particle size separating and washing the Step 701 of FIG. 11) to wash off any liquefied starch and send all the solids (grit and fiber) to a low Be liquefaction tank at the Step 604 to further liquefy any starch in the grit and fiber. This is followed by a liquid/solid separation at the Step 605 and a milling at the Step 606.

An improved process in accordance with some embodiments includes the improved liquid/solid separation and washing at the Step 702 (FIG. 7) and 702 (FIG. 11) to produce pure fiber (starch free fiber). Any particle size reducer such as grind mill, pin mill roller mill and another device can used for milling at the Step 606 (FIG. 11). A three section paddle screen can be used to separate liquids and solids.

Still referring to FIG. 11, an improved process in accordance with some embodiments includes liquid/solid separation at the Step 605 and liquid/solid separation and washing the Steps 701 and 702. The liquefied starch from liquid/solid separation and washing (e.g., particle size separation and washing at the Step 701) can be used for fermentation at the Step 104 to produce alcohol followed by distillation at the Step 105 to recover alcohol. The whole stillage from the distillation column bottom can be sent to a nozzle centrifuge at the Step 1130 to separate solids from liquids. The liquid, which can contain about 5 to 7% soluble and insoluble solids are fed to a decanter at the Step 1140 to concentrate dry solid content to about 35% DS. At the decanter 1140, the solids are sent to a Step 1120 of a ring dryer to produce yeast/germ protein, and the liquid stream is recycled as a backset stream.

At the Step 1107, the de-oiled syrup mix with cake from a screw press at the Step 1107 along with the pure fiber from liquid/solid separation and washing at the Step 702 are sending to a dryer at the Step 108 to produce DDGS as animal feed.

Still referring to FIG. 11, an improved process in accordance with some embodiments includes generating the 12 Be starch slurry from degerm process 200 of FIG. 11 (e.g., like the process 200 of FIG. 2), followed by starch/gluten separation 400 of FIG. 11 (e.g., like the process 400 of FIG. 4) and then finally starch washing process 500 of FIG. 11 (e.g., like the process 500 of FIG. 5) to produce a 23 Be high purity starch (less than 0.3% protein) slurry, which meets the standard as a feedstock/raw materials a biotech process use. In the event, when biotech processes require a different standard of a feedstock, such as with a less pure starch slurry as a feedstock, some of the starch purity process can be simplified or eliminated. For example, the long 50-to-60-hour batch steeping process can be shortened to a less than 10 hour continue soaking/steeping process.

Still referring to FIG. 11, an improved process in accordance with the invention can include starch/gluten separation process 400 of FIG. 11 (e.g., like the process 400 of FIG. 4). This process can be replaced by one 10 mm starch cycle net. The 12 stages starch washing process can be decreased to a 6 stage washing process (as an example, other numbers of stages are within the scope of the Present Disclosure). The starch purity and starch yield decreases by eliminating some selected steps.

For Improvements of Existing Dry Mill Plants:

In the existing dry mill plants, corn is fed thought a hammer mill to produce corn flour. In the following, the Present Disclosure illustrates the sizes of particle distribution of the milled corn flower are used as the basis for better separation of the ingredients in the milled corn flower.

The particle size distribution of corn flour with various screen sizes is shown in a plot 1-1 of FIG. 15. The average particle size of the corn flour is shown in a plot 1-2 of FIG. 16. As shown in a plot 1-3 of FIG. 17, the % protein vs particle size, particle sizes larger than 500 microns mainly comprise germ grit. Fiber particles and particles smaller than 500 microns mainly comprise floury endosperm and horny endosperm. The Plot 1-3 shows that the small particles are mainly free starch from floury endosperm.

The plots 1-2 shows the corn flour size distribution. Plot 1-3 shows the relation between the amount of protein and particle size. Therefore, plots 1-2 and 1-3 illustrates the amount of available free starch and % protein in this starch. For example, when a 100-micron screen were used to remove small particle solids, the yield would be about 10% starch with about 1% protein in the starch. If a 250-micron screen were used, the yield would be about 20% starch with about 2.75% protein.

The starch yield can also be improved with a purer starch (lower % protein) by bypassing the larger particle (for example 500 micron) to a pin mill first. Further, a small screen is used (for example 250 micron) to take out starch particles smaller than 250 microns. The starch yield is higher than 20% and the % protein in the starch will be less than 2.75% as compared with without the addition of using a pin mill. Any particle size separation device such as vibration screen can be used for separating free starch from floury endosperm to produce pure starch for bio tech processes and leave over larger solid particles in corn flour with grit fiber and germ particles as a feedstock for alcohol production in the improved dry mill processes.

The Followings are Improvements to Dry Mill Processes in Accordance with Some Embodiments:

1) FIG. 7 illustrates an improved dry mill process 700 to produce pure starch fit for use as a biotech feedstock and to produce pure fiber before fermentation in accordance with some embodiments.

Referring to FIG. 7, in some embodiments, the corn kernels are sent to hammer mill at a Step 109 with a screen size of 6/64 to 9/64 inch. The corn flour from hammer mill at a Step 109 is fed to a particle size separation step (e.g., screen 703). At the Step 703, the screen opening of the screen at a Step 703 can be 100 microns (range from 50 to 400 micron).

At the Step 703, the small solids in a small particle portion that pass through the screen are sent to a liquefaction at the Step 704, followed by a saccharification at the Step 705, to be converted to corn syrup. At the Step 705, the corn syrup, with up to 50% DS is fed to mud centrifuge at the Step 706 to remove mud (a mixture of oil, germ, protein, and fine fiber) as a light phase, which is separated from a heavy phase having a clean liquefied starch solution. At the mud centrifuge at the Step 706, the mud phase (e.g., the light phase) is sent to fermenter at the Step 104 to recover oil in the back end.

Still referring to the Step 703, the larger particle portion of corn flour has high fiber, oil and more protein content than corn as a whole. Therefore, the dry mill process benefits from this as feed stock for alcohol production. The fiber can be removed/separated during the liquefaction at the Step 704, as shown in a process 700 in FIG. 7.

At the mud centrifuge Step 706, the heavy phase (e.g., clean corn syrup) is passed to a precoat drum filter at the Step 707 to polish the corn syrup in accordance with some embodiments. This clean corn syrup of the heavy phase with more than 40% DS is an ideal feedstock for biotech processes.

Now referring back to the Step 703 of FIG. 7, the larger particle portion from screen separation at the Step 703 contain mainly grit, germ, and fiber. The large particle portion is sent to a slurry tank at a Step 101, wherein a liquid from solid/liquid separation and washing at a Step 701 is served as cook water to slurry tank at the Step 101.

Next to the slurry tank at the Step 101, a liquefaction process is performed at a jet cooker at a Step 102, follow by a first liquefaction at a Step 103. At the Step 103, a more than 26 Be liquefied starch, with grit and fiber, is sent to particle size separation and washing at a Step 701 to separate liquefied starch liquid from grit and fiber. Preferably, separation is performed by using a three section paddle screen in accordance with some embodiments.

At a Step 604 after the Step 701, an overflow from a second liquefaction at the Step 604 is used as washing liquid in this three section paddle screen (e.g., at Step 701) to wash liquefied starch to be separated from the grit and fiber solid. With the counter current washing process (from the Step 604 back to the Step 701) at the three-section paddle screen and a high-rate washing design, the Be in second liquefaction at the Step 604 can be maintained less than 5 Be. Therefore, the grit and any residual starch attached to fiber will continue to be cooked and liquefied.

Thus, the grit in this low Be liquefication solution at the Step 604 is soft and much easier to break and release starch. After the Step 604, a liquid/solid separation at a Step 605, milling at a Step 606 and liquid/solid separation and washing at a Step 702 are performed to separate fiber and wash the fiber to produce pure fiber (less than 15% protein, less than 4% oil and less than 3% starch) for secondary alcohol production, paper industry or as a cow feed.

Continuing at the Step 702, the cook water is used as washing water to wash fiber off any oil, protein and starch before discharging as wet cake from this three-section paddle screen back to the Step 604 (e.g., liquefaction 2). The washing fiber wet cake can be further dewatered in a screw press at the Step 708 to 43% DS.

Now referring to fermenting at a Step 104, the mud phase from mud centrifuge at the Step 706 along with a high Be liquefied starch slurry from particle size separation and washing at the Step 701 are sent to a fermentation process at the Step 104 to convert corn sugar to alcohol, followed by distillation at a Step 105 to concentrate the alcohol to produce fuel grade alcohol.

At a Step 105 (e.g., distilling), the whole stillage from the distillation bottom is sent to decanter centrifuge at a Step 106 to separate solids in a solid portion from liquid portion. The liquid portion contains 4 to 6% soluble solid along with the insoluble solids are sent to an evaporator at a Step 107, so that the liquid is concentrated to contain a 30 to 35% DS syrup.

Now referring to a Step 108, the pure fiber from screw press at the Step 708, fine fiber and protein cake from decanter centrifuge at the Step 106, and de oiled syrup from oil recovery at a Step 110 are sent to a dryer at a Step 108 to produce DDGS as an animal feed. This DDGS can also further processed and making into four animal feeds as described in process 900 of FIG. 9.

At a Step 110, the oil recovery from the backend (post fermentation) has a much darker color and higher fatty acid content, which is not suitable for human consumption and is suitable to be used as a feed stock for bio diesel processes. In contrast, corn oil is recovered in the front-end (e.g., before fermentation) for human consumption as described in a process 600 of FIG. 6.

2) FIG. 6 illustrates an improved dry mill process 600 to produce pure starch fit for use as a biotech feedstock and to produce pure fiber and germs before fermentation in accordance with some embodiments.

Process 600 improves the dry mill process to produce pure starch for bio tech processes plus it removes fiber and germ in the front-end (e.g., before fermentation).

After hammer mill at a Step 109, the corn flour goes through size separation using a screen at a Step 703, followed by liquefaction at a Step 704, and saccharification at a Step 705. After the Step 705, a mud separation at a Step 706 and a precoat drum filter at a Step 707 are performed to produce clean corn sugar solution, which can be used as a feedstock for biotech processes as described in detail above with respect to process 700.

Referring to the Step 703, the larger particles, mainly grit, germ and fiber, are added to slurry tank at the Step 101 along with washing liquid from solid/liquid separation and washing at a Step 702, which are used as cook water to liquefy starch by going through jet cooker at a Step 102 and liquefaction 1 at a Step 103. Following the Step 103, the liquefied starch with germ, grit and fiber particles are sent to degerm process at a Step 609, which can be the same or similar to the Step 1200 of Figure the 12.

The Step 609 (e.g., Step 1200 of the FIG. 12) uses a liquefied starch solution as the liquid media to separate germ as the light phase and the heavy phase (having grit and fiber) using a two-stage dual germ cyclone process. The liquefied starch slurry with germ, grit and fiber particles are sent to a first stage tank at a Step 1202 of the FIG. 12, then fed to a first stage dual germ cyclone at a Step 1205 of the FIG. 12. The overflow from first dual germ cyclone at the Step 1205 of the FIG. 12 is sent to a germ recovery and washing at a Step 1208 of the FIG. 12 to produce clean germ particles for oil extraction. The underflow from first dual germ cyclone is fed to a dewatering and milling at a Step 1203 of FIG. 12 to dewater then to a second stage tank at a Step 1204 of the FIG. 12, then to a second dual cyclone and overflow from second dual germ cyclone recycle back to first stage tank at a Step 1202 of the FIG. 12. The underflow from second dual germ cyclone sent to a Step 300 of the FIG. 12 to dewater with liquids going back to optional milling the Step 1203 of FIG. 12 and send to $2^{nd}$ stage tank at a Step 1204 of the FIG. 12.

Referring to the Step 1204 of the FIG. 12, the partially de-germed liquefied starch slurry, with grit and fiber, are pumped from $2^{nd}$ stage tank 1204 to second stage dual germ cyclone at a Step 1206 to recover the rest of the germ particles. At the Step 1206, the overflow from first dual germ cyclone with germ particles is recycled back to first stage tank at the Step 1202 and the underflow from first dual germ cyclones is sent to the second dual germ cyclone. Still at the Step 1206, The overflow from the second dual germ cyclone is recycled back to second stage tank 1204 and the underflow from second dual germ cyclone is sent to the Step 1203 liquid/solid separation and washing at the Step 300.

Referring to the Step 300 of the FIG. 12, a three-section paddle screen separation apparatus is advantageously used to separate grit and fiber. In the FIG. 12, separation and washing at the Step 300 (preferably with a three section paddle screen apparatus) is used to form a solid portion in the fiber and grit slurry, which is used as feedstock for alcohol production. The solids in the solid portion go to the Step 604 of the FIG. 6. The degerm process washes off any liquefied starch before discharge washing solids to liquefication 2 at the Step 604 of the FIG. 6.

Referring back to the Step 300 of the FIG. 12, the filtrate from the first section screen is sent back to 2nd stage tank at the Step 1204 (FIG. 12). The filtrate from the 2nd and 3rd section screens is sent back to first stage tank at the Step 1202 of FIG. 12.

Still referring to the Step 300 of the FIG. 12, the back-set stream used as washing water in the three sections paddle screen (at the Step 300) can be used for replacement washing to wash off liquefied starch from grit and fiber particles to maintain low Be in liquefication 2 at the Step 604 of FIG. 6. Referring to the FIG. 6, a two stage dual germ cyclone for high Be liquefied starch can be used after liquefication 1 at the Step 103 of FIG. 6 or can use a stage dual germ cyclone for low Be liquefication 2 at the Step 604 of FIG. 6 or somewhere in between, depending on the pure starch yield and germ purity needed.

In the FIG. 6, process 600A illustrates a portion process for producing pure starch, liquid starch or pure corn sugar (e.g., for a biotech feedback) in accordance with some embodiments. The process 600B illustrates the other portion process for making alcohol in accordance with some embodiments.

Still referring to the Step 604 of FIG. 6, the grit and any starch attached to fiber will be further soaked/cooked and liquefied in the liquefaction 2, followed by liquid solid separation at a Step 605 of FIG. 6 and milling at a Step 606 of FIG. 6 to break up grit to release more starch. After the Step 606, it is followed by washing in liquid/solid separation and washing at the Step 702 to produce pure fiber for secondary alcohol production or paper industry or cow feed.

After the Step 702, the three section paddle screen apparatus used in this step and cook water used as washing water to washing off all the starch germ and oil on the fiber can produce pure fiber (less than 15% protein, less than 4% oil and less than 3% starch).

Now referring to the Step 104 of the FIG. 6, the liquefied starch slurry from germ washing at the Step 1208 (FIG. 12) plus de-oiled germ protein from solvent extract at a Step 608 in the FIG. 6 is sent to the Fermentation at the Step 104 to produce alcohol, followed by distillation at the Step 105 to concentrate the alcohol. The whole stillage from the distillation bottom is sent to decanter centrifuge at a Step 106 to separate liquid from solid. From the decanter at the Step 106, the liquid (thin stillage), containing 4 to 6% insoluble and soluble solids, is sent to evaporator at the Step 107 to concentrate the solid content to 30 to 35% DS syrup. This syrup is mixed with fiber from screw press at a Step 708, plus wet protein cake from optional decanter centrifuge at the Step 106 and sent to a dryer at the Step 108 to produce DDGS as animal feed.

Now referring to the degerm process at a Step 609, the washed germ normally is sent through a dryer first (not shown in FIG. 6) followed by screw press at a Step 607 to press out a portion of the oil. This is followed by a solvent extraction at the Step 608 to extract more oil as in a typical wet mill process. The oil from this extraction process has a light color and low fatty acid. It can be used for human consumption. However, the de-oiled germ may endure some protein loss of nutrient value because the high temperature in the oil extraction step denatures the germ protein.

As illustrated in FIG. 6, the process contains front milling at the Steps 604 to 606, which produce pure fiber for secondary alcohol production and decrease the percentage of in the DDGS to as low as less than 3%. The current dry mill process can convert more than 92% starch to alcohol.

3) FIG. 8 illustrates an improved dry mill process 800 to produce pure starch fit for use as a biotech feedstock and to produce pure fiber and organic oil before fermentation in accordance with some embodiments.

Additional improvements to the dry mill process are illustrated as a process 800 in the FIG. 8. Process 800 is advantageous to produce pure starch for bio tech processes plus it removes pure fiber and oil at the front end (before fermentation). Process 800 includes an oil/germ recovery at the Step 801. An oil cell breaker at the Step 802 and an oil/germ protein separation at the Step 803 can produce organic corn oil for human consumption before fermentation.

In the FIG. 8, process 800A illustrates a portion process for producing pure starch, liquid starch or pure corn sugar (e.g., for a biotech feedback) in accordance with some embodiments. The process 800B illustrates the other portion process for making alcohol in accordance with some embodiments.

The process 800 of the FIG. 8 can begin with producing corn flour using a hammer mill at the Step 109, wherein the corn flower is sent to particle size separation screen at a Step 703. At the Step 703, a small particle portion (e.g., less than 100 microns (can be 50 to 400 micron)) are mainly "free starch" from the floury endosperm, is sent to liquefication at a Step 704, followed by saccharification at a Step 705, followed by a mud centrifuge at a Step 706, to remove oil and fine solids (e.g., fine fiber, protein etc.) in a light phase, whereas a heavy phase is sent to precoat drum filter at a Step 707 to produce pure corn sugar solution for biotech processes.

At the Step 703, the larger particle portion includes mainly grit (horny endosperm), germ and fiber mix. The larger particles in the larger particle portion are subjected to washing liquid from liquid/solid separation and washing at a Step 702, wherein the large particle portion is sent to slurry tank at a Step 101, which followed by jet cooker at a Step 102 and liquefication 1 at a Step 103, to liquefy the starch product to more than 26 Be liquefied starch slurry with grit, germ, and fiber particles. At the Step 103, the stream feed is sent to a three section paddle screen separation and washing at a Step 701, to separate larger particles (e.g., 100 micron (can be 50 to 400 micron)) and washing before being sent to low Be (less than 5 Be) liquefication 2 tank at the Step 604. At the Step 604, the overflow from this low Be liquefication 2 tank Step 604 can be used as washing water at the Step 702 to wash off liquefied starch.

At the Step 702, the washing liquid with liquefied starch is sent back to slurry tank at the Step 101. At the Step 702, the filtrate from the first section of the three section paddle screen separation apparatus is subsequently sent to a mud centrifuge at the Step 801 to separate oil and germ as a mud phase (light phase), which mixes with the mud phase from a mud separation at the Step 706, and then sent to oil cell breaker at a Step 802. At the Step 802, a high shear particle size reducer such as a Supraton can be used in this step to break the oil cell wall to release more oil. The pH should be adjusted to about 2 and a nontoxic solvent such as butanol or ethanol should be added to increase the oil yield.

After oil cell breaker at the Step 802, the oil/germ protein mix can be fed to oil/germ protein separation at a Step 803 to separate oil as a liquid phase and germ protein as a solid phase. The oil from oil/germ protein separation at the Step 803 contains an "organic oil" suitable for human consumption. At the Step 803, the germ protein from oil/germ protein can be sent to fermenter at the Step 104 and has high value germ protein.

At the Step 604, the grit and fiber soak/cook in low Be liquefication 2 at the Step 604 is sent to liquid/solid separation at a Step 605 and milling at a Step 606 and liquid/solid separation and washing at a Step 702 to produce pure fiber.

Now referring to the Step 801, the clean, liquefied starch slurry from mud separation at the Step 801 and germ protein cake from oil/germ separation at the Step 803 are fed to the fermentation at the Step 104 to produce alcohol. This is followed by distillation at the Step 105 to concentrate and recover the alcohol as fuel alcohol. At the Step 104, the whole stillage from the distillation bottom is sent to decanter centrifuge at a Step 106 to separate solids (mainly corn protein) from liquids (thin stillage). At the Step 104, the thin stillage is sent to evaporator at a Step 107 and concentrated to about 35% DS syrup. At a dryer of a Step 108, the product from the Step 107 is then mixed with pure fiber from liquid/solid separation at the Step 702. Optionally, part or all of the wet cake from decanter centrifuge at the Step 106 is sent to a dryer at a Step 108 to produce DDGS as animal feed. This DDGS has high nutrient value but has very high fiber (pericarp and tip cap from corn). Generally, it is used as cow feed.

4) FIG. 9 illustrates an improved dry mill process 900 to produce pure starch fit for use as a biotech feedstock and to produce pure fiber and organic oil before fermentation and four animal feed after fermentation in accordance with some embodiments.

In the FIG. 9, process 900A illustrates a portion process for producing pure starch, liquid starch or pure corn sugar (e.g., for a biotech feedback) in accordance with some embodiments. The process 900B illustrates the other portion process for making alcohol in accordance with some embodiments.

An improved dry mill process to separate DDGS to four more pure and higher value animal feed for various animals is shown as process 900 in the FIG. 9. Process 900 can produce pure starch for biotech processes plus pure fiber for secondary alcohol production or the paper industry. It also produces "organic" oil in the front end (before fermentation). Process 900 also can produce four animal feeds for various animals (cow, pig, chicken, fish, and household pet).

This new dry mill process 900 is further improved by adding a syrup enrichment at a Step 908 by adding probiotic culture to 30% DS syrup, followed by a secondary fermentation to convert residual sugar to lactic acid and produce enriched syrup having up to 20% lactic acid (in DB) and $10^9$ CFU probiotic/g. The enriched syrup can be further evaporated in a Step 905 to up to 85% DS enriched syrup, which can be mixed with any wet feed as a supplement and food preserver.

More details of the process 900 is further disclosed below. At a Step 109, the corn flour, is produced at a Hammer mill at the Step 109, is sent to particle size separation at a screen at a Step 703. At the Step 703, the small particle portion (e.g., less than 100 microns in some embodiments or can be 50 to 400 microns in some other embodiments) are mainly "free" starch from the floury endosperm. The small particle portion is sent through liquefication at a Step 704, saccharification at a Step 705, mud separation at a Step 706, and precoat drum filter at a Step 707, to produce clean pure corn syrup for biotech processes.

At the Step 703, the larger particle portion from particle size separation at the Step 703 (mainly grit (horny endosperm), fiber and germ) is mixed with the washing liquid from three section paddle screen at the Step 702 as cook water, which then flows to slurry tank at a Step 101.

At the Step 101, it is followed by cooking at a jet cooker at a Step 102 and liquefication 1 at a Step 103 to produce liquefied starch to form more than 26 Be liquefied starch slurry with some grit, germ and fiber. The slurry is then fed to particle size separation at a Step 701 to remove the larger grit, germ and fiber particles. The slurry then flows to low Be (less than 5 Be) liquefication 2 at a Step 604 to further liquefy any starch in the grit, germ and fiber particles. The slurry then proceeds to a Step 605 for a liquid solid separation.

At the Step 606, the particles with residual starch inside soak/cook in much lower Be liquid become much softer and easier to break up in milling at the Step 606 to release starch. This is followed by a liquid/solid separation at the Step 702 to wash off any oil, protein and starch from the fiber and produce pure fiber (less than 15% protein, less than 4% oil, less than 3% starch) for secondary alcohol production or paper industry use or cow feed.

At the Step 701, the filtrate from liquid/solid separation is sent to a mud centrifuge at a Step 801 to remove mud (oil and germ) and produce a clean liquefied starch slurry, sent to fermenter at the Step 104.

The mud phase from both mud separation at a Step 706 and a Step 801 is sent to oil cell breaker at a Step 802 to break oil cell walls inside the germ. Next is oil/germ protein separation at a Step 803 to recover oil as organic oil for human consumption. The germ protein from oil/germ protein separation at the Step 803 is sent to fermenter, to produce more value animal feed after fermentation at a Step 104. A high shear particle size reducer such as a Supraton can be used in this step. A two/three phase decanter can be used for oil/germ protein separation at the Step 803.

The whole stillage, after fermentation at the Step 104 and distillation at the Step 105, is sent to particle size separation at a Step 901 to separate coarse solids (fiber germ and grit) from fine solid (e.g., protein). The filtrate from particle size separation at the Step 901 is sent to decanter at the Step 903 to recover corn protein (Zein protein) as wet cake, followed by dryer at the Step 109 to produce a gluten meal with 50% protein for example as a chicken feed. The overflow, containing the fine protein (yeast and germ protein) from the decanter at the Step 903, plus filtrate from first and second paddle screens of the Step 901 are sent to a nozzle centrifuge at a Step 904 to break the oil/protein emulsion and concentrate the protein to around 30% by volume. The underflow from nozzle centrifuge at the Step 904 is sent to protein decanter at the Step 906 to produce high value yeast and germ protein wet cake. This is followed by dryer at a Step 907 to produce HP50 protein meal for household pets or fish farms.

The overflow from decanter at the Step 906 is recycled. The overflow from nozzle centrifuge at the Step 904 is sent to evaporator at a Step 107 to concentrate the stream to about 30 to 35% DS syrup. Thereafter, an optional oil recovery step (not shown) can be used to recover any oil if economic and justified this step.

The 30 to 35% DS syrup is fed to enrichment at a Step 908 to convert residual sugar to lactic acid by the addition of lactic acid probiotic culture, such as *Lactobacillus plantarum* ZJ316, *Lactobacillus amylovorus*, *Lactobacillus fermentum*, or *Lactobacillus mucosae*. This secondary fermentation can produce up to 20% (in DB) lactic acid and $10^9$ CFU probiotic units. This enriched process can further concentrate up to an 85% DS syrup by low temperature vacuum evaporation to avoid high temperatures destruction of nutritional value inside the syrup. This high concentration syrup can also by-pass the dryer and to be added to super dry feed after the dryer to maintain 10% moisture in the feed products. This 85% DS enriched syrup can also be used as an animal food supplement or part of baby animal milk and animal drinking water formula.

FIG. 10 illustrates a corn wet milling process 1000. The corn feedstock is fed through a continuous or a batch steeping at a Step 1600. The corn is steeped in approximately 200 PPM sulfur dioxide solution for 50 to 60 hours to soften the corn kernels. The steeping corn fully absorbs water to about 50% DS. Excess steeping liquid passes to an evaporator. The process/step described in the present Disclosure using the same referencing number is able to be performing the same function in different figures. Each of the detailed processes 200, 300, 400, and 500 are further illustrated in detail in the respective FIGS. 2, 3, 4, and 5.

The steeped corn next passes through a degerm process 200 as shown in greater detail in FIG. 2 to remove/recover germ from the steeped corn.

Referring to FIG. 2, the steeped corn is fed to a first milling at a Step 201 to tear open the whole corn to release starch in the floury Endosperm. This forms about a 12 Be starch slurry ("Be" or "B" refers to a slurry density) in a first stage tank at a Step 202. This 12 Be starch slurry as liquid media with germ, grit and fiber particles is pumped to a first set of dual germ cyclones at a Step 205 to separate germ from grit and fiber by using density difference. The germ particles lighter than the 12 Be starch slurry will come out as the light phase from a top of the first germ cyclone. This is then followed by a dewatering and washing at a Step 208 to produce germ for further corn oil recovery. The grit and fiber particles heavier than the 12 Be starch slurry will come out from the bottom of the second germ cyclone, followed by a 2nd milling and dewatering at a Step 203 to break up grit (Horny Endosperm) so that to release more starch. This then flows down to a 2nd stage tank at a Step 204.

Be is a unit that is commonly used in a wet mill industry for an amount of starch in a starch slurry. One Be equals to 1,777% by weight of a starch content in starch solution/slurry. There is density measure in the Be scale, when a person of ordinary skilled in the art puts this density measured with Be scale in starch slurry. The amount of starch in starch slurry is known right away. In the wet mill industry, making a 23 Be starch slurry is about 40% by weight and is able to be used as a biotech process feedstock.

The heavy starch slurry with broken grit from $2^{nd}$ stage tank at a Step 204 is fed to a 2nd set of dual germ cyclones for germ/grit separation in a Step 206. The light phase from the first degerm cyclone contains a starch slurry with any germ particles that were not recovered by the first set of dual germ cyclones, which are recycled back to the first stage tank at the Step 202.

The heavy phase from the bottom of the second germ cyclone for germ/grit separation in the Step 206 is discharged to a liquid/solid separation at a Step 301, which is shown in FIG. 3. A separation process 300 is used to separate fine particles (e.g., less than 50 micron) starch and gluten from larger particles grit and fiber. The fine particle stream is sent to a starch and gluten separation process 400, which is shown in the FIG. 4. Referring again to FIG. 10, the larger particle stream is sent to a fiber separation washing and separation at the process 300, which is shown in greater details in the FIG. 3.

Process 300 for fiber separation and washing recovers more starch and produces gluten feed by-products. Typically, at least 5 counter current fiber washing stages are used to wash and recover starch from the fiber in process 300. The 12 Be starch slurry with grit (Horny Endosperm) and fiber flow to a 50-micron pressure screen for dewatering. Then, in a final milling at a Step 307, the slurry is further ground to further break the grit particles to release more starch. The slurry then drops to a washing tank at a Step 305.

A process 400 of the FIG. 4 is for using water in a fiber washing process of counter current washing the fiber, wherein the water is able to come from starch/gluten separation at the process 300, which can be connected to the 8th (last) washing thank of FIG. 3. The fiber comes to washing tank #2 and washing water comes in from last stage washing tank #8. The six 75-micron pressure screens are used to separate the fiber from washing liquid with starch. This six stage counter current fiber washing process 300 can be used for washing starch off the fiber.

The washed fiber proceeds through a fiber pre-dewatering at a Step 303. Process 300 then dries and produces fiber by-product as a gluten feed at the Step 304. The gluten feed normal starch content can be as high as 20%. Because some of starch still bond with fine fiber and protein inside Horny Endosperm it can go through three milling steps.

The liquid and fine starch pass through a 50-micron screen containing mainly starch/gluten slurry are sent to starch/gluten separation process 400 (see FIG. 4) in the FIG. 10. The starch/gluten separation in process 400 is shown in detail in the FIG. 4.

Two nozzle centrifuges in series are used in starch/gluten separation process 400 of the FIG. 4. The 12 Be starch slurry contains gluten from fiber separation process 300 is fed to a primary centrifuge at a Step 401. The overflow from first 10 mm starch washing cyclone of process 500 of the FIG. 5 is used as replacement washing in the primary centrifuge. The underflow flow from primary centrifuge at a Step 401 carries all the heavy solids (starch) to a starch washing process 500 of FIG. 5 and FIG. 10.

Starch/gluten separation takes place in primary centrifuge at a Step 401. The overflow from primary centrifuge at the Step 401 contains light solid gluten. It is then fed into a gluten thickener nozzle centrifuge at a Step 402 to produce clean overflow process water, which can be used for fiber washing process 300, degerm process 200 and steeping at the Step 1600 of FIG. 10. The underflow from gluten thickener nozzle centrifuge at a Step 402 is sent to a vacuum drum filter at a Step 403 to produce gluten meal cake with about 40% DS. The filtrate from vacuum drum filter at a Step 403 is fed to gluten thickener nozzle centrifuge at a Step 402.

The underflow from primary centrifuge at a Step 401 (FIG. 4) contains some protein (soluble and insoluble) plus other soluble solids (e.g., ash inside corn). This should be removed before this starch can be used as feed stock for many green technology processes. A 12-stage counter current starch washing process 500 of FIG. 5 with a 10 mm starch washing cyclone net is used for washing/removing soluble and insoluble protein plus soluble solid (ash).

The primary centrifuge underflow mixes with $3^{rd}$ stage 10 mmm cyclone feed after 1st stage (10 mm) cyclone. The overflow from $1^{st}$ stage 10 mm cyclone carries all the removed soluble and insoluble protein to starch/gluten separation process 400. The $1^{st}$ set stage 10 mm cyclone underflow is mixed with $3^{rd}$ stage 10 mm cyclone to feed 2nd stage 10 mm cyclone. This continues counter current washing the starch from the $1^{st}$ stage to the last stage (12) to produce pure starch as $12^{th}$ stage 10 mm cyclone underflow.

At the same time the washing water comes in from last (12) stage and moves forward and comes out of $1^{st}$ stage 10 mm cyclone overflow, carrying all the soluble and insoluble protein.

As illustrated in the process 1000 of FIG. 10, the wet mill process is extraordinarily complex and an extremely high capital investment. However, it produces the maximum yield of each available product (e.g., protein, starch, and germ etc.) and give maximum purity of all compound inside the corn.

Referring again to corn kernel 1400, two types of starch are inside. The starch inside floury endosperm 1420 is very loose and easy to separate out. The starch in horny endosperm 1430 is inside a protein cell wall and is not easy to free and separate. One important object of this invention is to provide a more simple and lower cost process to obtain the starch inside floury endosperm 1420 and purify that starch to meet new green technology process needs. The remaining starch inside corn kernel 1400 can be used as feed stock for alcohol production and produce maximum value of by-products such as oil and various animal feeds.

DETAILED DESCRIPTION OF THE PREFERRED EMBODIMENTS

Figure 14:
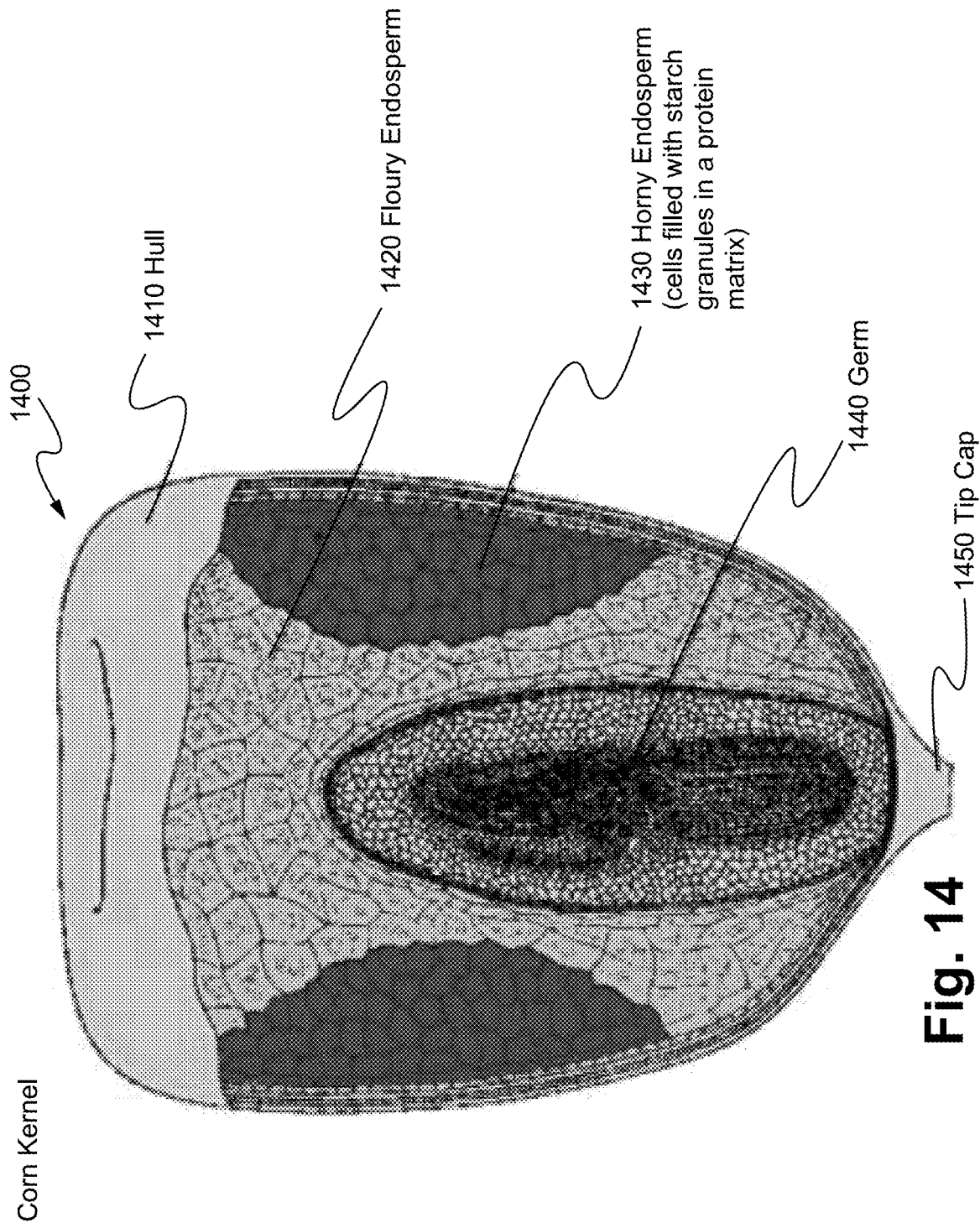
FIG. 14 illustrates a corn kernel in accordance with some embodiments.

A Yellow Dent Corn Kernel is illustrated in the FIG. 14 and its composition is illustrated in Table 1. There are 34.4 lbs. of starch per bush of corn. Most starch is contained in two types of endosperms including floury endosperm and horny endosperm. The starch inside floury endosperm is loosely packed inside the endosperm and quite easy to be separated out. It can be used to produce pure starch as feed stock for green technology processes. The starch in horny endosperm is contained in cells filled with granular starch in a protein matrix. It is not easy to separate out and produce starch with the bound protein.

Figure 10:
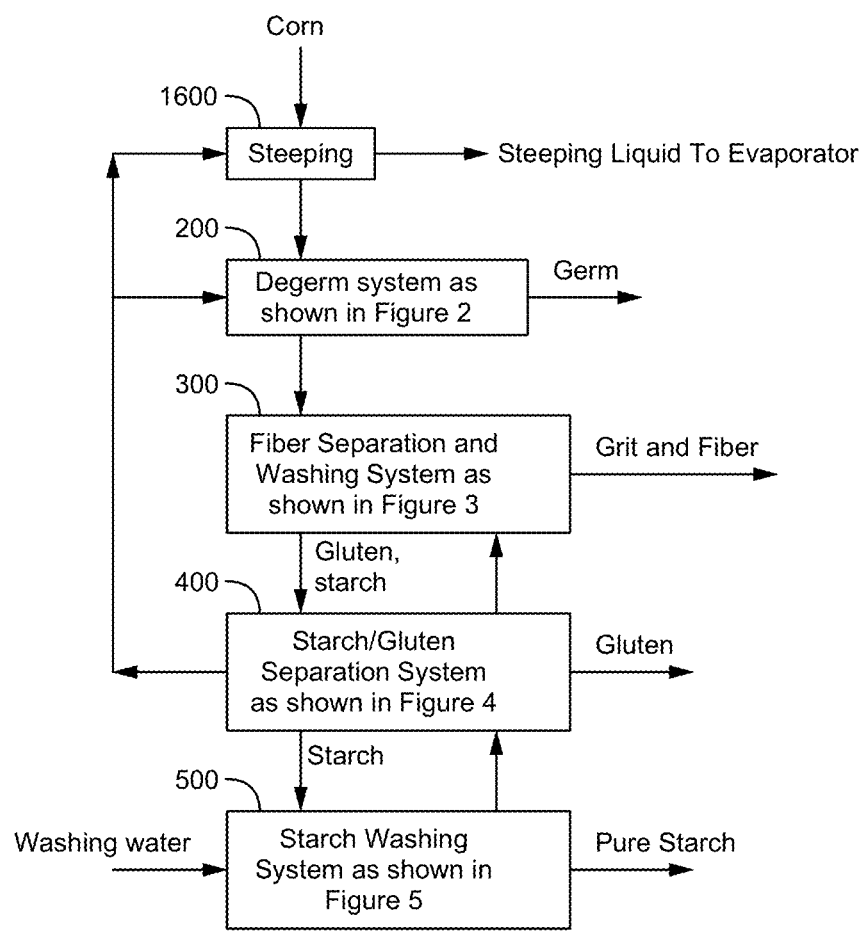
FIG. 10 illustrates a wet will flow diagram in accordance with some embodiments.

In some embodiments, an embodiment provides an optimum process/system to take the right amount of "free" starch (in most pure form from floury endosperm) and combine all the rest of the corn compounds (pericarp, tip cap, fine fiber, corn protein, germ and grit) as feed stock for a most optimum dry mill process/system to produce maximum alcohol yield and the most valuable by-products, such as organic oil for human consumption, corn oil for biodiesel, animal feed for cows, chicken, pigs, fish, and household pets, etc. A wet mill is a complex and costly system, which is illustrated in the process 1000 of FIG. 10.

In some embodiments, an embodiment only separates about half, e.g., 15 lb./bu "free" starch from the floury endosperm with a simple low cost improved wet mill process and use the rest of the corn as feed stock to produce alcohol and higher value-added byproducts with an improved dry mill process, which will described in detail below. In contrast to a typical dry mill process, which converts all the starch in corn to alcohol and uses more 2000-year-old technology.

In some embodiments, an embodiment provides a new simple most effect way to separate "free" starch from the floury endosperm first, and used rest of corn as feed stock for producing alcohol and high value by-products with an improved dry mill process which will described in detail below.

A) Improved Wet Mill Process in Accordance with Some Embodiments

Figure 11:
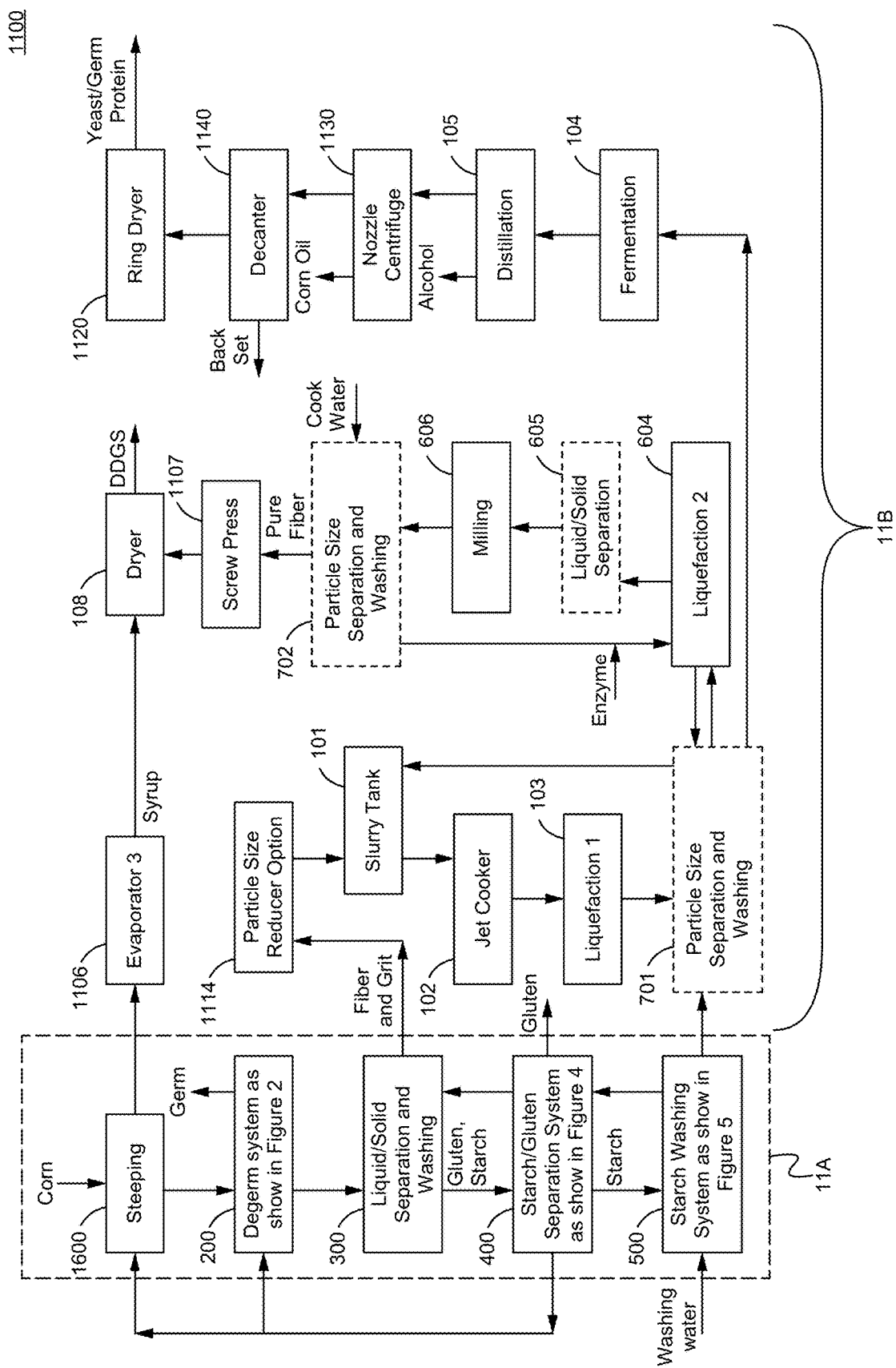
FIG. 11 illustrates improved wet mill process to produce fuel alcohol in accordance with some embodiments.

As illustrated in the process 1100 of FIG. 11, the corn goes through five steps to produce a pure starch slurry as a feed stock for green technology processes. The rest of the corn is used as feed stock for the dry mill process to produce alcohol and byproducts such as animal feed. The five steps process includes: a) soaking/steeping process 1600 is used for softening and hydrating the corn to have more than 45% of a moisture level; b) de-germing process 200 uses about 12 Be starch slurry as a liquid media to separate germ from grit and fiber by using density differences through the use of two different sets of Dual Degerm cyclone processes 200; c) using a new three section paddle screen process 300 to wash off starch from grit and fiber before being used as feed stock for a dry mill process to produce alcohol and valuable byproducts such as animal feed; d) using a starch/gluten separation process 400 with dual nozzle centrifuge to remove gluten from starch and produce value byproducts including gluten meal as chicken feed; and e) purifying the starch slurry purified in 12 stage 10 mm starch washing process 500 with 10 mm starch washing cyclone net and a counter current washing set up.

In the FIG. 11, process 11A illustrates a portion process for producing pure starch, liquid starch or pure corn sugar (e.g., for a biotech feedback) in accordance with some embodiments. The process 11B illustrates the other portion process for making alcohol in accordance with some embodiments.

Following are Short Descriptions of Each Step in More Detail:

1) Soaking/steeping process 1600 in the FIG. 11: The corns are soaked/steeped in a 100 to 200 PPM sulfur dioxide water solution at about 50° C. temperature (just below starch gelatin temperature) for 5 to 60 hours to soak and soften the corn kernel. The soaking/steeping time depends on desired starch yield and purity needs. Longer soaking/steeping give higher starch yield as well as higher purity starch. The soaking/stepping process 1600 can be a continuous or a batch system. Larger plants or existing wet mill plants can use typical batch systems. The new and small plants can use new continuous soaking/steeping systems. The process water used for soaking/steeping process 1600 comes from the gluten nozzle centrifuge overflow in a system such as in the process 400 of the FIG. 4. The process water can add lactic acid producing cultures to produce lactic acid before being sent to the steeping tank to speed up this soaking/steeping process.

Soaking/steeping process 1600 is normally set in counter current mode to maximize extract/remove soluble solids (e.g., ash inside the corn) from corn. The soaking/steeping corns fully absorb water and have more than 45% moisture in less than 10 hours. The steeping liquid from this soaking/steeping step has about 8 to 10% solids, and is then sent to evaporator 3 at the Step 1106 to concentrate the stream to around 30 to 40% DS (dry substance) syrup. This syrup contains most plant nutrient ($K^+$ and $P^+$) plus a lot of lactic acid (up to 10% in DB (e.g., in dry base) can used as natural organic insect repellent to keep bugs away from young plants. The concentrated syrup also can be mixed with fiber from a screw press at a Step 1107, then dry in a dryer at the Step 108 to produce DDGS as a cow feed.

Figure 1:
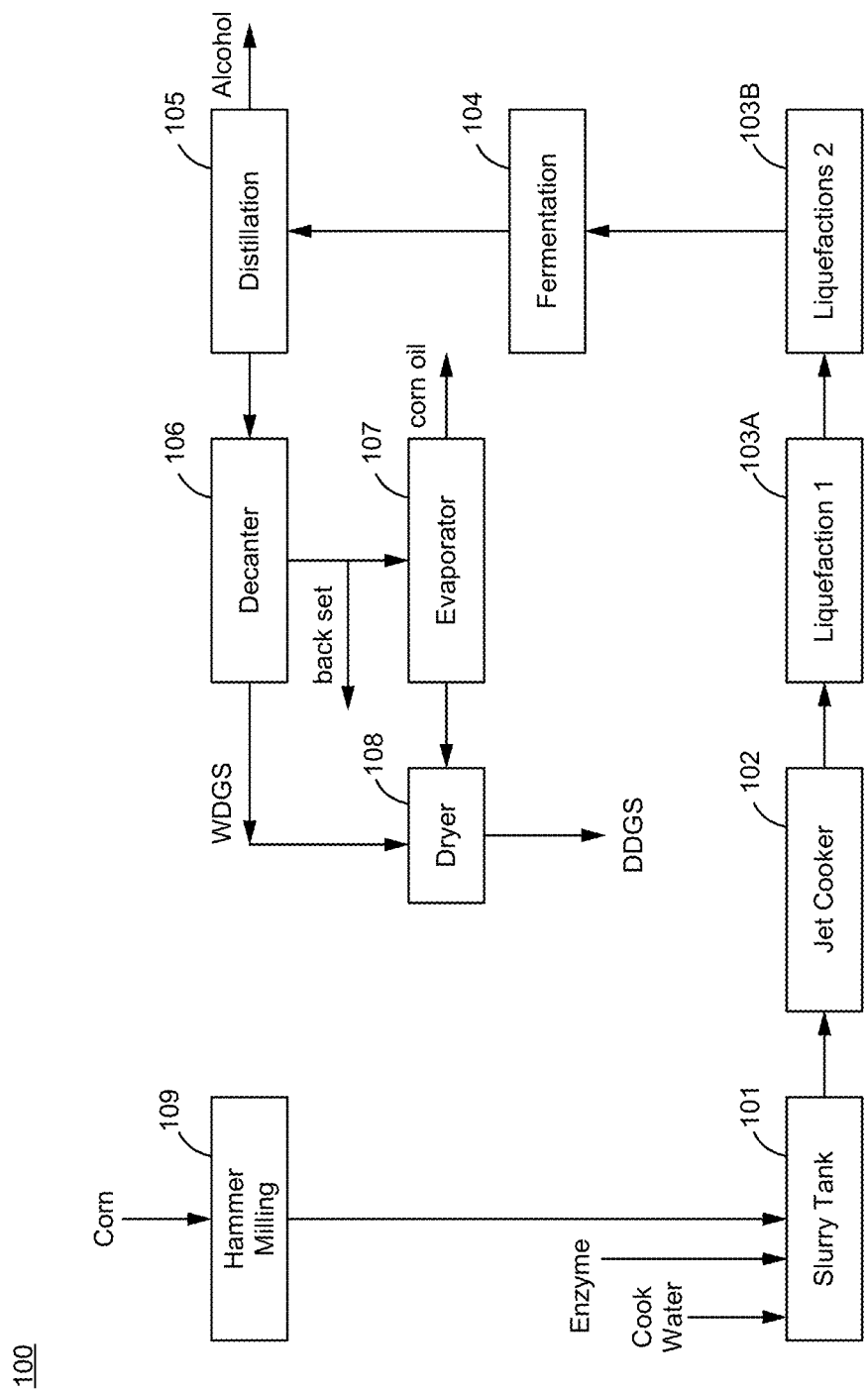
FIG. 1 illustrates a typical dry mill process.
Figure 2:
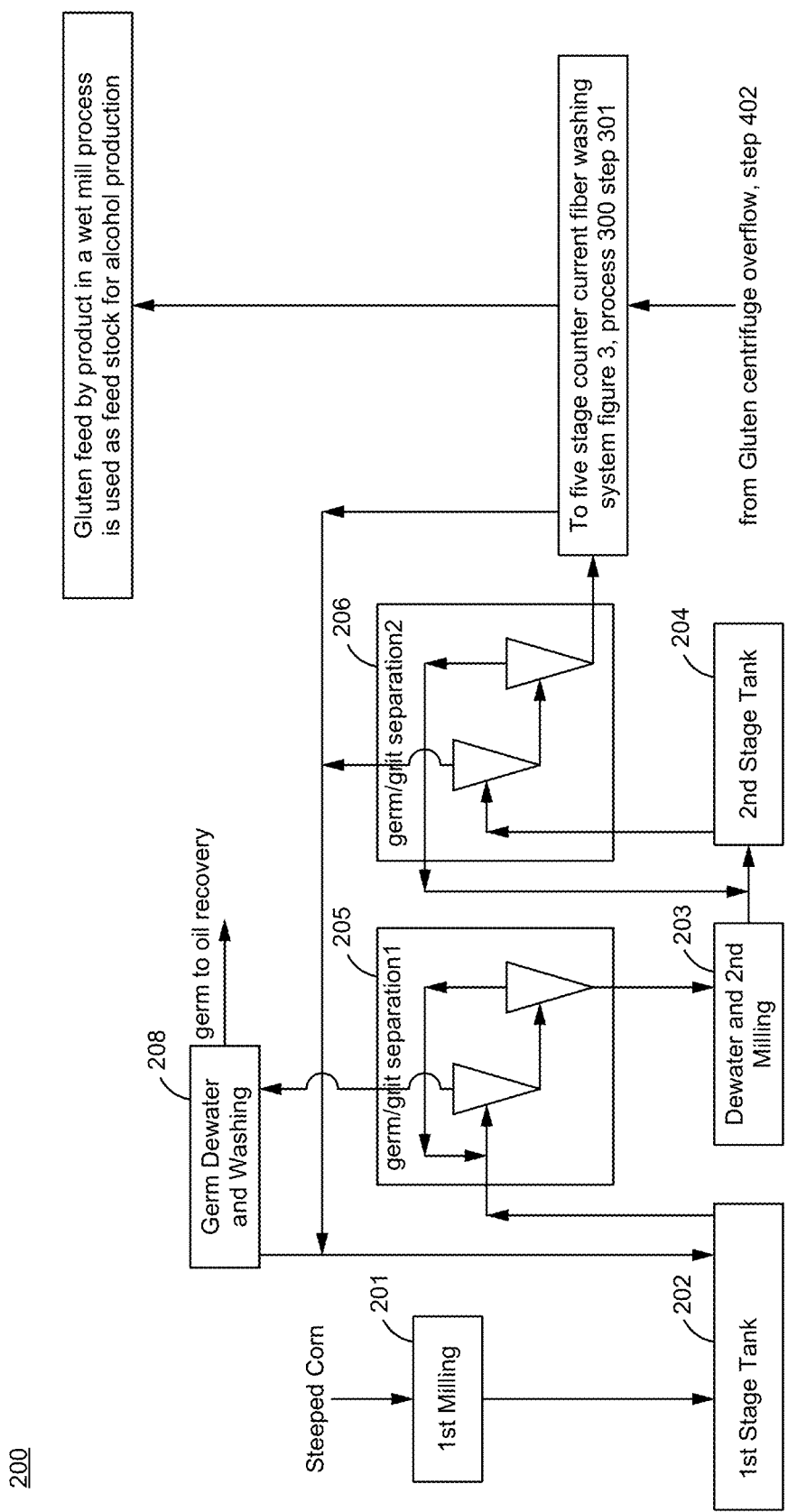
FIG. 2 illustrates a degerm process using germ cyclone in accordance with some embodiments.

2) The de-germ process 200 in the FIG. 11 after the process 1600, which can be the same or similar to the process 200 of the FIG. 2: The soaking/steeping corns with about more than 45% of moisture is fed to the de-germ process 200 shown in more detail in the process 200 of the FIG. 2. The soaking/steeping corn is fed to the 1$^{st}$ milling at the Step 201 of the FIG. 2 to tear open the corn to release the starch and drop to 1$^{st}$ stage tank at the Step 202 to form about 12 Be starch slurry. A grind mill or roller mill can be used to open the corn kernels. This 12 Be starch slurry is used as a liquid media to float germs in two dual germ cyclone process, which includes a 9-inch degerm cyclone followed by an 8-inch de-germ cyclone. Optionally, a 6-inch cyclone process (a 6-inch A cyclone follow by a 6-inch B cyclone) can also be used in a small plant.

At a Step 205, the 12 Be starch slurry with germ, grit and fiber particles are fed to a 1$^{st}$ set of dual germ cyclones in the 1$^{st}$ germ/grit separation. Since the germ particles are lighter than the liquid, so the germ particles come off at the top of the first germ (9 inch) cyclone as an overflow, which are next sent to germ dewater and washing at a Step 208 to produce pure germ for further extracting corn oil thereafter. Still at a Step 205, the underflow from the first (9 inch) cyclone is fed to a second (8 inch) cyclone. Still at a Step 205, the overflow from the second (8 inch) cyclone is sent back to the 1$^{st}$ stage tank set at a Step 202. The grit and fiber heavier than the liquid come out from the bottom of the second cyclone as underflow, followed by dewatering and milling at a Step 203 and sent to a 2$^{nd}$ stage tank at a Step 204. The 12 Be starch slurry with residual germ particles that are not removed during the 1$^{st}$ germ/grit separation at the Step 205 are fed to the 2$^{nd}$ germ/grit separation at the Step 206 with other set of dual degerm cyclone process at the Step 206 to recover more germ.

Figure 3:
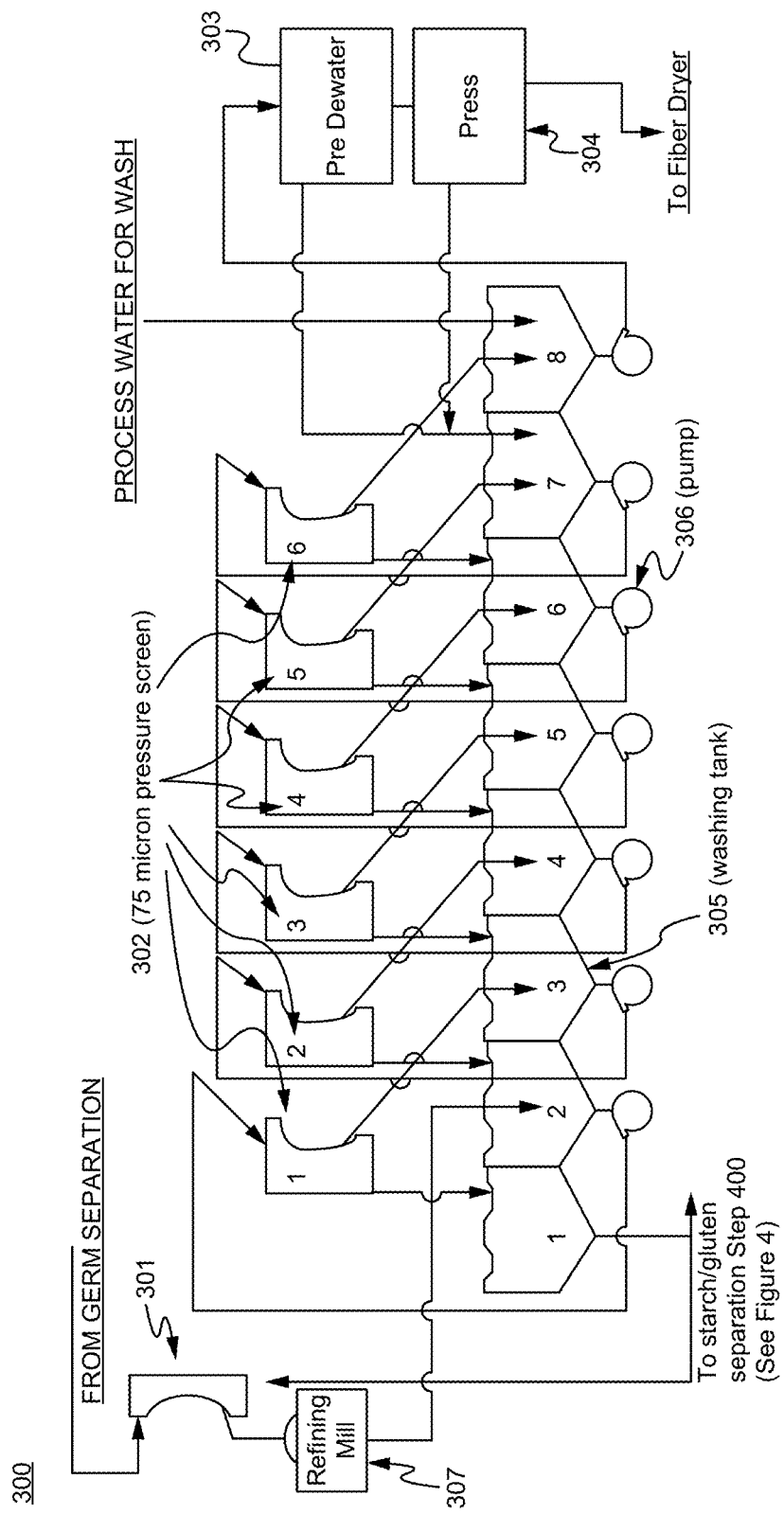
FIG. 3 illustrates a fiber washing process with multi stage pressure screen counter current washing in accordance with some embodiments.

In the second set dual germ cyclone process, the overflow from first germ cyclone is recycled back to the 1$^{st}$ stage tank at the Step 202. The underflow from the first cyclone is fed to the second cyclone and overflow from the second cyclone is recycled back to the 2$^{nd}$ stage tank at the Step 204. The underflow from the second cyclone is fed to three section paddle screen at the Step 300 (continue at the Process 300 of the FIG. 3) to wash off the free starch out of grit/fiber before sending it to a dry mill plant to produce alcohol and byproducts such as animal feed.

3) Liquid/solid separation and washing at the process 300 in the process 1100 of the FIG. 11: The new three section paddle screen described in the U.S. Provisional Patent application 63/131,035 is incorporated herein by reference, which can be used to separate grit and fiber from the starch slurry as a degerm process 200 underflow. This new paddle screen has a three sectional screen: a) a first screen 50-micron slots open, for example, parallel to the flow; b) 2$^{nd}$ and 3$^{rd}$ screen sections with 75-micron slots open, for example, parallel to the flow. The underflow from the last de-germ cycle contains a 12 Be starch slurry with grit, fiber, and larger solid particles is fed to this three-section paddle screen at the Step 300. The overflow from the gluten centrifuge at the Step 402 of FIG. 4 can be used as washing water in this step. The filtrate from the first screen section can be fed to starch/gluten separation in the process 400. The filtrate from the 2$^{nd}$ and 3$^{rd}$ screen section can be fed to the 1$^{st}$ stage tank at the Step 201 to mix with ground corn from the Step 201 to form a 12 Be starch slurry in the 1$^{st}$ stage tank at the Step 201.

Figure 4:
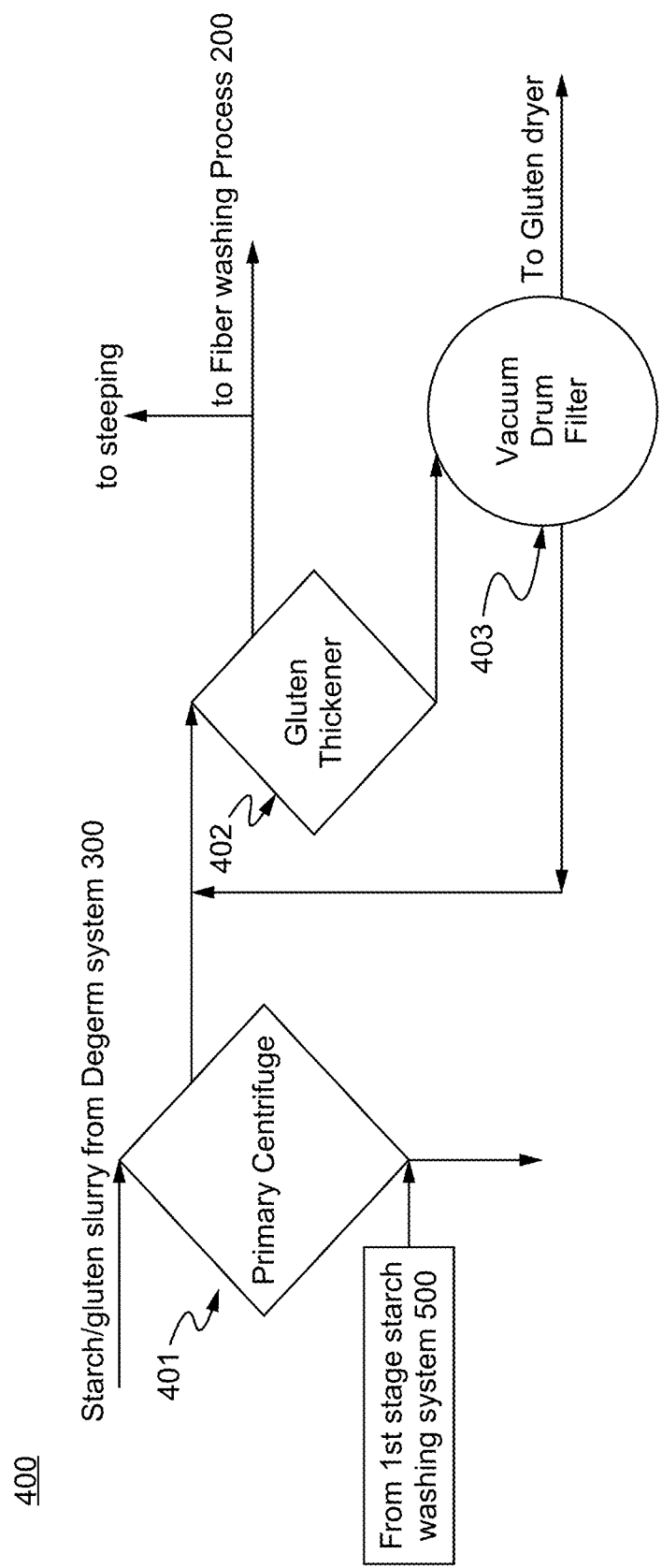
FIG. 4 illustrates a starch/gluten separation process in accordance with some embodiments.

4) Wet milling process 1100 of FIG. 11 includes starch/gluten separation process 400 of FIG. 4: The 12 Be starch slurry from the first filtration from the three-section paddle screen at the process 300 is sent to the starch/gluten separation at the process 400. The 12 Be starch slurry is sent to a primary centrifuge at a Step 401 to separate gluten from starch in starch/gluten separation process 400 in the process 400 of FIG. 4.

At a Step 401, the starch slurry (around 22 Be) come out as the heavy phase from a primary nozzle centrifuge. The washing water from a first stage starch washing at the Process 500 of FIG. 11 is fed from the bottom of primary nozzle centrifuge at the Step 401 as replacement washing water at the outer edge of the inter bowl of primary centrifuge at the Step 401 to wash gluten from the starch before the starch comes out as the heavy phase from the nozzle of primary nozzle centrifuge at the Step 401. The gluten that is lighter than the starch will come out as the light phase from the top of primary centrifuge at the Step 401. It is then fed to a gluten thickener centrifuge at a Step 402 to further concentrate the slurry to more than 30% by volume gluten, as underflow.

At the Step 402, clean process water comes out as the light phase from the top of gluten nozzle centrifuge. The clean water is used as process water for the de-germ at the Process 200, grit and fiber separation and washing at the Process 300, and steeping water for soaking/steeping at the process 1600. The underflow from gluten thickener centrifuge at the Step 402 is sent to a vacuum drum filter to further dewater the gluten to produce about 40% DS gluten cake. The cake is further dried in a dryer to produce gluten meal, which can be used as chicken feed.

Figure 5:
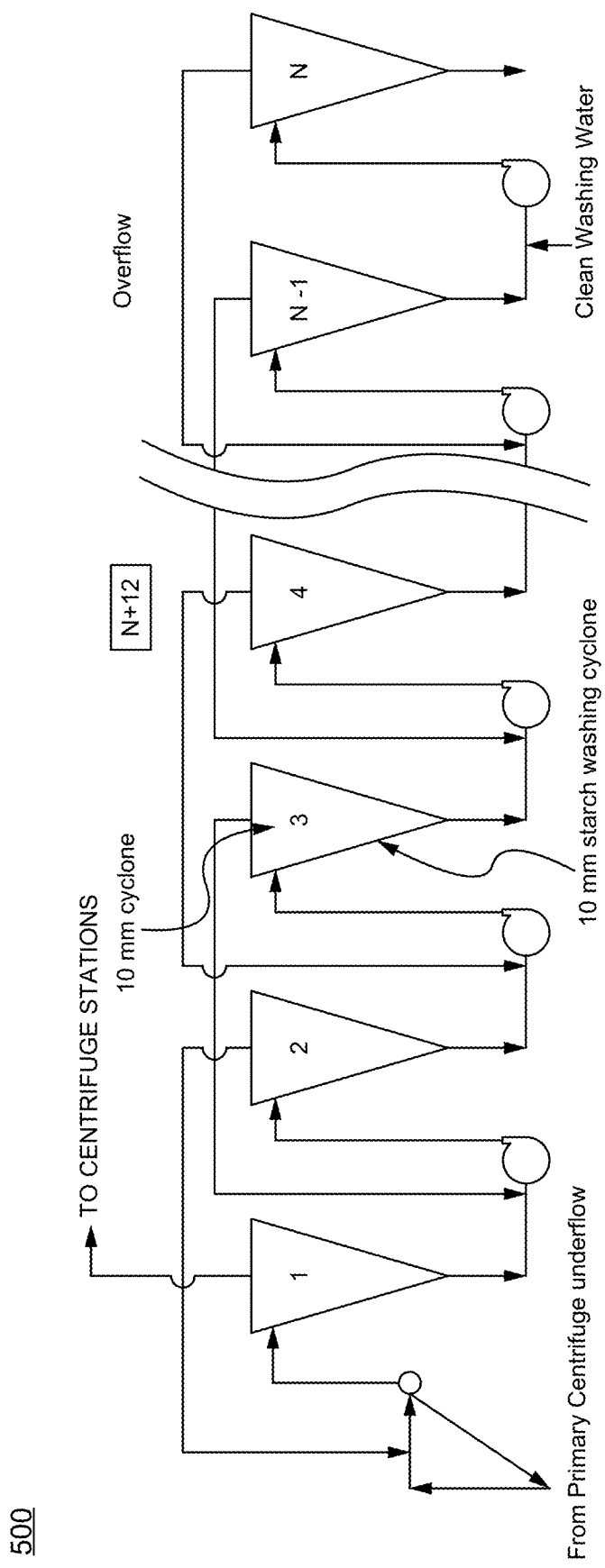
FIG. 5 illustrates a starch washing Process in accordance with some embodiments.

5) Starch washing process 500 of the process 1100 in FIG. 11, which can be the same or similar as it is further described in more detail in the FIG. 5. An approximately 20 to 22 Be starch slurry from the primary centrifuge underflow is mixed with the overflow from the 2$^{nd}$ stage of multi (normally 12 stages) stage 10 mm starch washing cyclone net. The slurry is then fed to the 1$^{st}$ stage 10 mm starch washing cyclone net to perform dilute washing and to separate and purify the starch slurry by removing soluble and insoluble protein from the starch slurry with a counter current washing setup. The starch slurry flows downstream from the 1$^{st}$ stage to a 2$^{nd}$ stage, then continues to a 3$^{rd}$ stage and so on until it comes out as a last (12) stage starch washing cyclone underflow as a pure 23 Be starch slurry with less than 0.35% protein on a dry basis. The clean water used as the washing water enters the last stage (12 stage), then flows upstream to perform the dilution washing/separation from stage 12 to stage 11. The water then continues to flow countercurrent to stage 10, and so forth until it comes out from the 1$^{st}$ stage starch washing cyclone overflow, which will be used as the washing water in the primary centrifuge in starch/gluten separation at the process 400 (described in detail in the FIG. 4).

The starch slurry flows though fiber washing process 300, gluten/starch separation process 400, and starch washing process 500, to maximize starch yield and purity. When this high starch yield and purity in the starch slurry is not needed, some of the starch purification steps can be eliminated to meet the starch purity specification for any particular green technology process.

The solid phase from Liquid/solid separation at the process 300 of the FIG. 11 contains much less starch than corn. This can be taken into consideration to use this as a feed stock for alcohol production. It is important to remove the fiber and germ in the front end (prior to fermentation and during the liquefication) in order to produce high alcohol content in the beer.

The solid phase (grit and fiber) from liquid/solid separation at the process 300 of FIG. 11 can go through another optional particle size reducing at the Step 1114 before going to slurry tank at the Step 101, followed by a jet cooker at the Step 102 and liquefaction tank 1 (higher than 26 Be) at the Step 103 to liquefy the starch. The slurry is then fed to liquid/solid separation at the Step 701 to separate solid (grit and fiber) from liquid (liquefied starch). The solid (grit and fiber) from liquid/solid separation at the Step 701 is sent to liquefaction tank 2 at the Step 604 (lower than 5 Be) to further liquefy the starch in much lower Be. This is followed by liquid/solid separation at the Step 605, then milling at the Step 606 to break solid (grit) further. The slurry is then fed to liquid/solid separation and washing at the Step 702.

Cook water is used to wash any starch/grit/protein off the fiber to produce pure fiber before fermentation. The washed fiber follows to screen press at the Step 1107 to produce 43% DS cake. It is then mixed with the syrup from the evaporator at the Step 1106 and fed to the dryer at the Step 108 to produce DDGS. The steeping liquid from soaking/steeping at the process 1600 contains mainly soluble solids from inside the corn. It is sent to evaporator 3 at the Step 1106 to concentrate the liquid to 30 to 40% DS syrup. It is then mixed with the fiber to produce DDGS.

The above separate two liquefication tank to high Be (>26 Be) liquefication at the Step 103 and low Be (<5 Be) liquefication at the Step 604 with new three section paddle screen with high rate washing capability at the Step 701 in accordance with some embodiments. The screen of the 1$^{st}$ section can be 75 microns (can be 50 to 200 microns, depending on oil and alcohol yield) with the screen slots parallel to the direction of flow. The 2$^{nd}$ and 3$^{rd}$ section screens can be 200 microns (100 to 600 microns, depending on oil and alcohol needed) with the screen slots open parallel to fluid flow. The filtrate from the first screen section can be sent to fermentation at the Step 104. The filtrate (washing liquid) from the 2$^{nd}$ and 3rd screen sections can be recycled back to slurry tank at the Step 101 of FIG. 11. The liquid from three section paddle screen at the Step 702 can used as washing water to wash off any germ and grit and fine fiber particles smaller than 200 microns. The filtrate with those middle size solid particles is recycled back to the slurry tank.

The whole stillage, after fermentation at the Step 104 followed by a distillation at the Step 105, is sent to a nozzle centrifuge at the Step 1130 to separate oil from protein. The oil stream come out as the light phase from the clarifier as feed stock for biodiesel production. The protein stream comes off as the heavy phase from clarifier at the Step 1130 and is sent to protein decanter at the Step 1140 for dewatering to produce a yeast protein wet cake. The cake is further dried in a ring dryer at the Step 1120 to produce high grade protein for household pets and fish farms. The overflow from protein decanter at the Step 1140 is recycled as a backset stream.

B) Improved Dry Mill Process

As illustrated in the FIG. 14 and Table 1, there is about 34 lb/bu starch inside corn kernels. The starch in the floury endosperm is "free" starch, loosely packed inside and very easy to separate in order to "free" pure starch granules. Thus, the "free" starch disclosed in the Present Disclosure is referred to as "free starch" or "freed starch" when such starch is released out from the kernels.

The starch in the horny endosperm is in the form of starch granules in a protein matrix (called grit), which is not easy to be broken up to release the starch. One object of this disclosure is providing a simple and effective way to separate starch from the floury endosperm (e.g., free starch) and produce a purer form of corn sugar for bio tech processes. Then all the rest of the corn kernel components (pericarp, tip cap, germ, and grit) are used as a feed stock for an improved dry mill process to produce maximum alcohol yield and high value byproducts (oil and animal feeds.) Thus, when it is referred as a free starch or freed starch, such starch is primarily or more than substantial portion (e.g., great than 50%, 75%, or 99%) originally contained in the floury endosperm of the corn.

Figure 15:
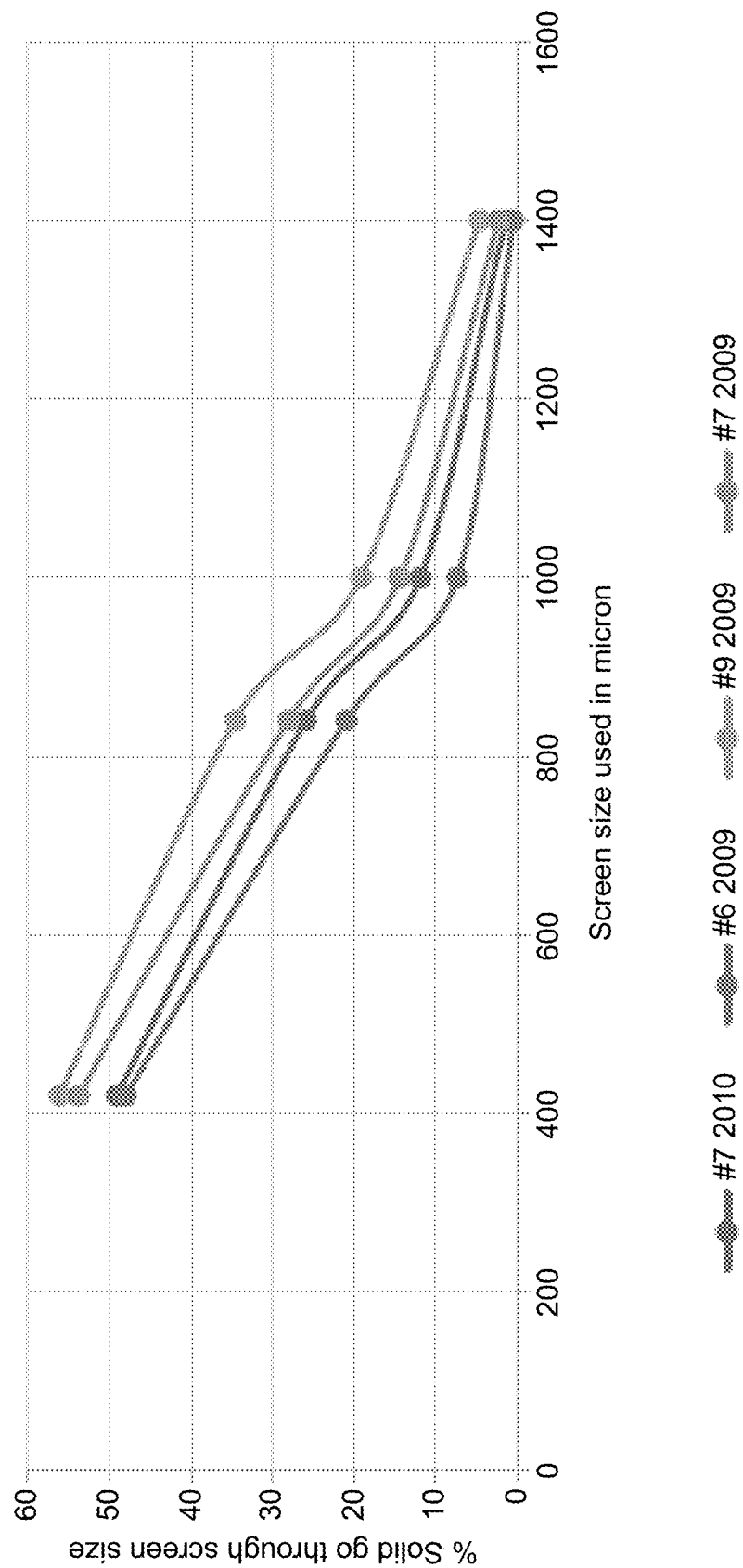
FIG. 15 illustrates corn flour particle size analysis after hammer milling, with different screen sizes in accordance with some embodiments.

As illustrated in FIG. 15, plot 1-1 shows a corn particle size distribution after hammer milling with various screen sizes. It shows that about 50% of the corn flour is larger than 500 micron and a majority are pericarp, tip cap, germ, and grit.

Figure 16:
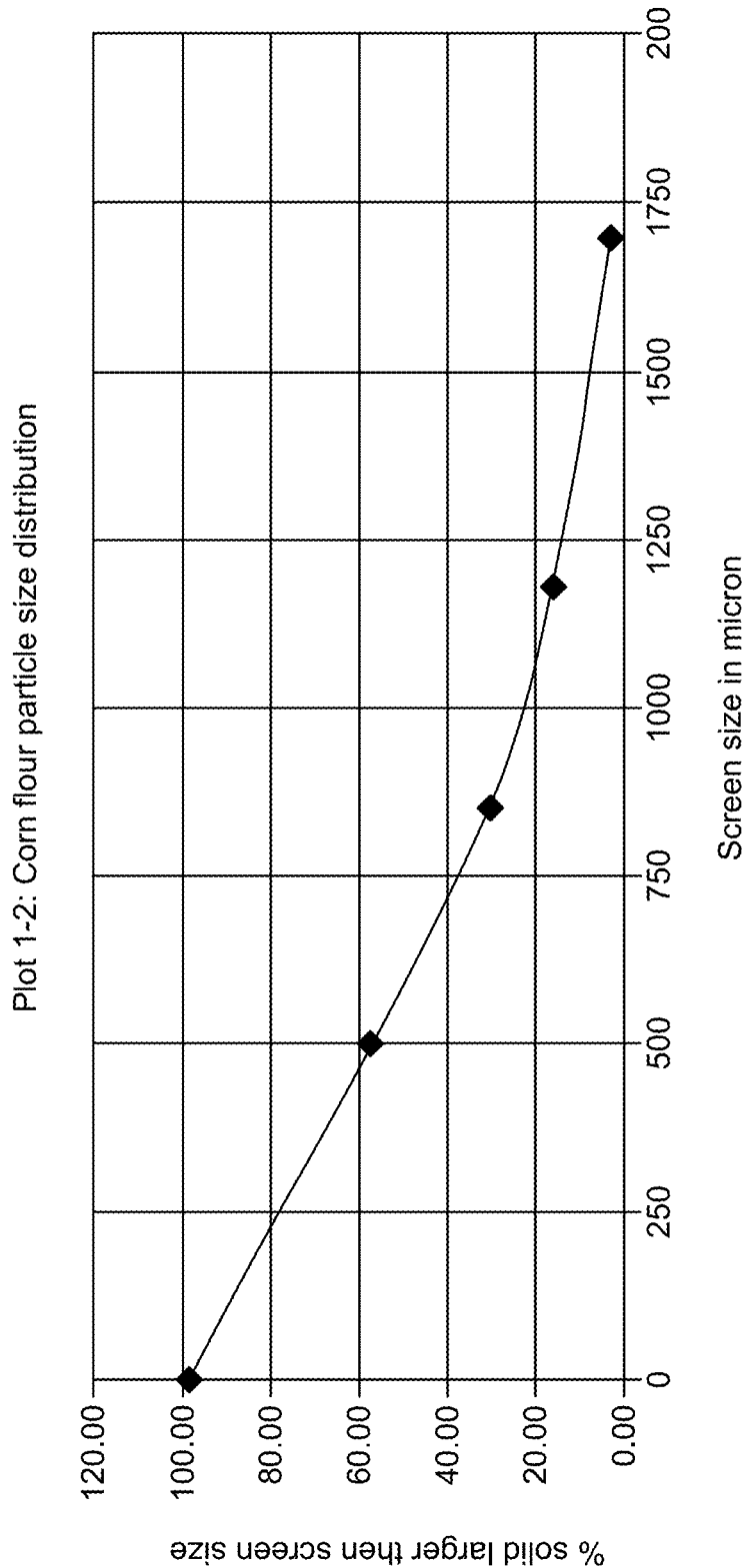
FIG. 16 illustrates corn flour size distribution in accordance with some embodiments.

Referring to FIG. 16, plot 1-2 shows the average particle size in corn flour in USA dry mill plants. It shows that about 10% corn flour has a particle size smaller than 125-micron, 20% corn flour is smaller than 240-micron, 30% corn flour is smaller than 375-micron and 40% corn flour is smaller than 500-microns. Those small particles are mainly starch from floury endosperm and horny endosperm.

Figure 17:
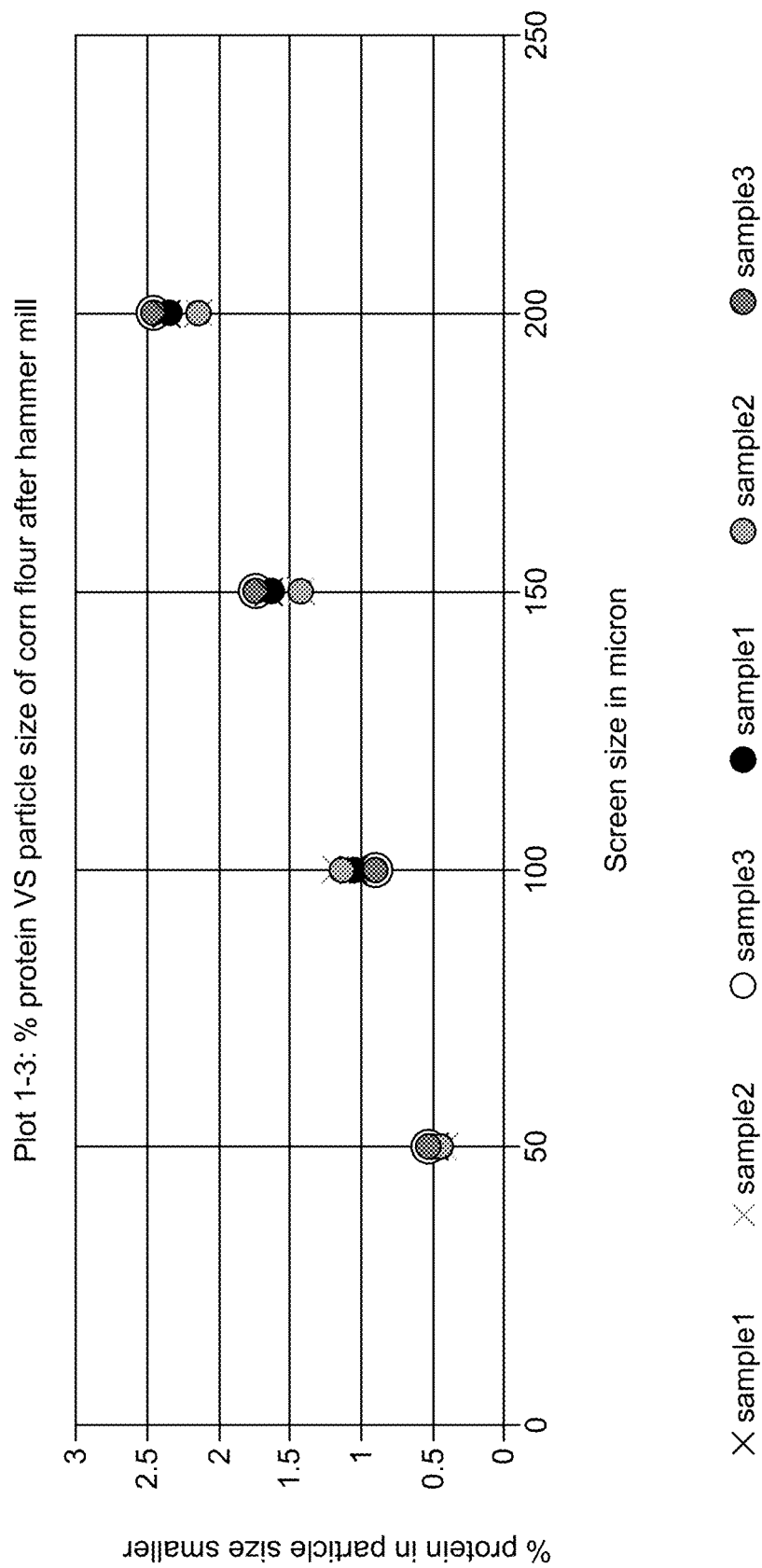
FIG. 17 illustrates protein v. particle size of corn flour after hammer milling in accordance with some embodiments.

The percentage of protein in those small corn flour particles are shown in FIG. 17, plot 1-3. This shows that smaller particles are starch from the floury endosperm with lower protein. Therefore, it is possible to separate and produce "free starch" or freed starch from the floury endosperm. This "free" starch yield and purity (% protein) can be controlled by the screen size used in separation at the Step 703 of the FIG. 7. Any screen separation method, such as a vibration screen, can used in this screening step. The particles smaller than the screen openings go through screen at the Step 703, to liquefication at the Step 704 and saccharification at the Step 705, to produce corn syrup. They are then sent to mud centrifuge at the Step 706 to separate any oil/germ as light (mud) phase then follow by precoat drum filter at the Step 707 to remove any fine solids and produce clean pure corn syrup for biotech processes.

In some embodiments, grinding the larger particles one or more times to increase pure starch yield or improve pure starch purity. Any solid particle size reducer such as roller mill or pin mill can be used. The larger particles stay on top of the screen at the Step 703 and can be used as feedstock for an improved dry mill process to produce various byproducts.

Following are some improvements to the dry mill process in accordance with some embodiments.

Figure 7:
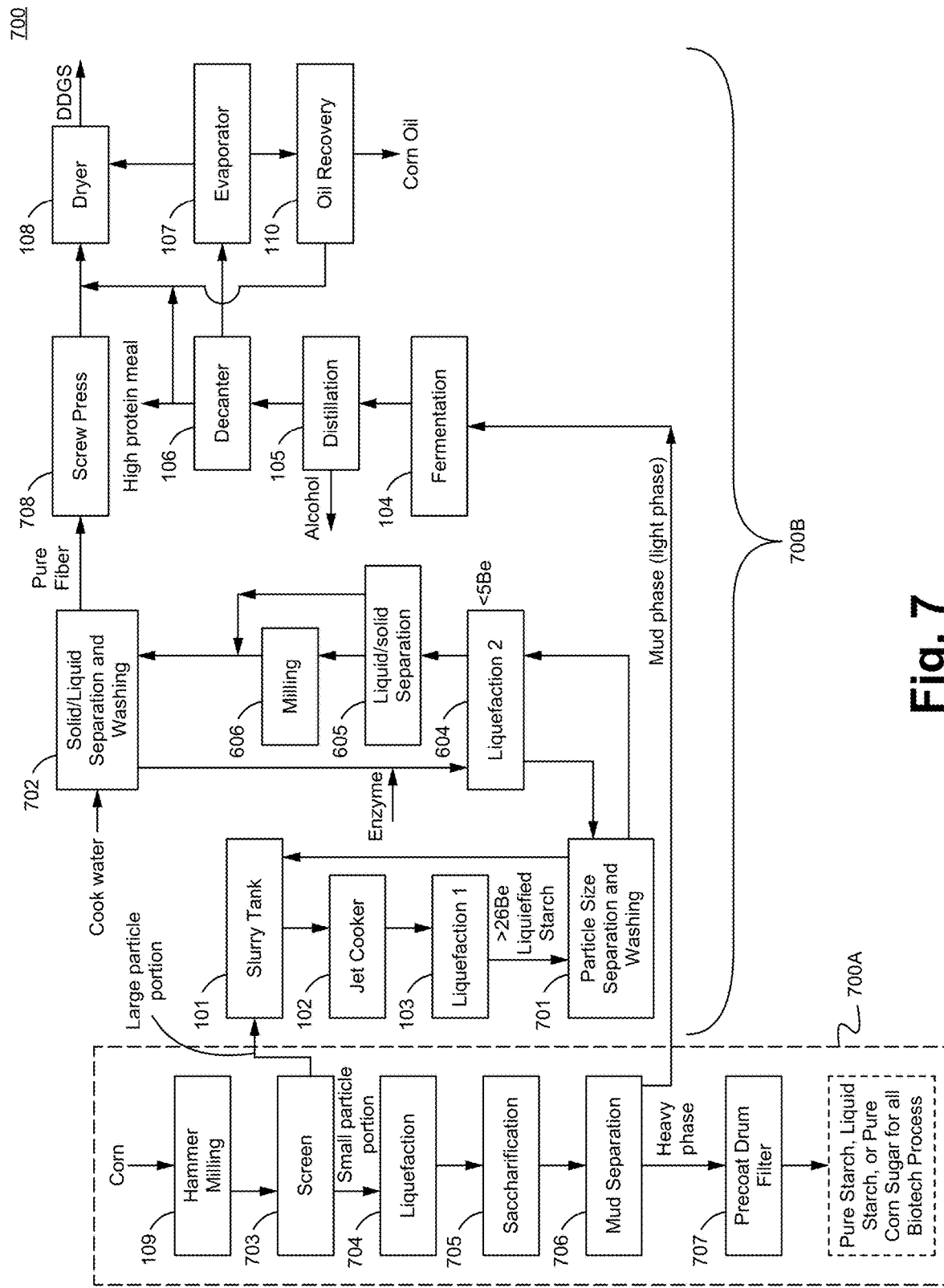
FIG. 7 illustrates an improved dry mill process to produce pure starch for biotech processes and produce pure fiber before fermentation in accordance with some embodiments.

1) Process 700 of FIG. 7: Improved Dry Mill Process with Removed Fiber Before Fermentation.

The larger solid particles from screen separation at the Step 703 are sent to slurry tank at the Step 101 with filtrate from liquid/solid separation at the Step 701, which are used as cook water as a starting point of the liquefication process, followed by jet cooker at the Step 102 and liquefaction 1 at the Step 103 to liquefy the majority of starch at higher temperature (above 110° C.) and higher Be slurry. The high Be liquefied starch slurry with grit, germ and fiber is sent to liquid/solid separation and washing at the Step 701. The new three section paddle screen is used separate high Be liquefied starch slurry with small grit and germ particles (depending on screen size used on this paddle screen) from first screen section and sent to fermentation at the Step 104. The overflow from liquefication 2 at the Step 604 can be used as the washing water for the second and third screen sections of the three-section paddle screen to wash off the liquefied starch from the solid particles (grit, germ and fiber).

In the FIG. 7, process 700A illustrates a portion process for producing pure starch, liquid starch or pure corn sugar (e.g., for a biotech feedback) in accordance with some embodiments. The process 700B illustrates the other portion process for making alcohol in accordance with some embodiments.

At the Step 604, the output is a wet washed cake, sent to liquefication 2. The solids will continue to soak/cook in low Be (e.g., less than 5 Be) to further soften grit and germ particles. This is followed by liquid/solid separation and dewatering at the Step 605, then particle size reduction milling at the Step 606 to break up the grit and germ particles to release more starch and oil. This is followed by liquid/solid separation and washing at the Step 702 to produce pure fiber (less than 3% starch, less than 4% oil and less than 15% protein) at around 3 lb./bu yield. This pure fiber is ideal feed stock for secondary alcohol production and paper industry use. It can also be followed by screw press at the Step 708 to produce 43% DS cake. The cake can be mixed with de-oiled syrup at the Step 108 to, then dryer at the Step 108 to produce 20 to 30% pro-fat cow feed per market needs. The high protein cake from decanter at the Step 106 can all or partially be added to dryer at the Step 108 to increase the pro-fat in the DDGS up to 30%.

The whole stillage, after fermentation at the Step 104 and distillation at the Step 105, is sent to decanter at the Step 106 to remove the solids (mainly protein and fine fiber). The overflow (thin stillage from decanter at the Step 106) is sent to evaporation at the Step 107, to concentrate the fluid to 30 to 35% DS syrup, followed by oil recovery at the Step 110 to recover oil for biodiesel production. The oil recovery from oil recovery at the Step 110 occurs after fermentation, and is dark in color and high in fatty acid content (up to 10%) and not ideal to be used for human consumption. The oil should be recovered before fermentation if it is to be used for human consumption, as described below.

Figure 6:
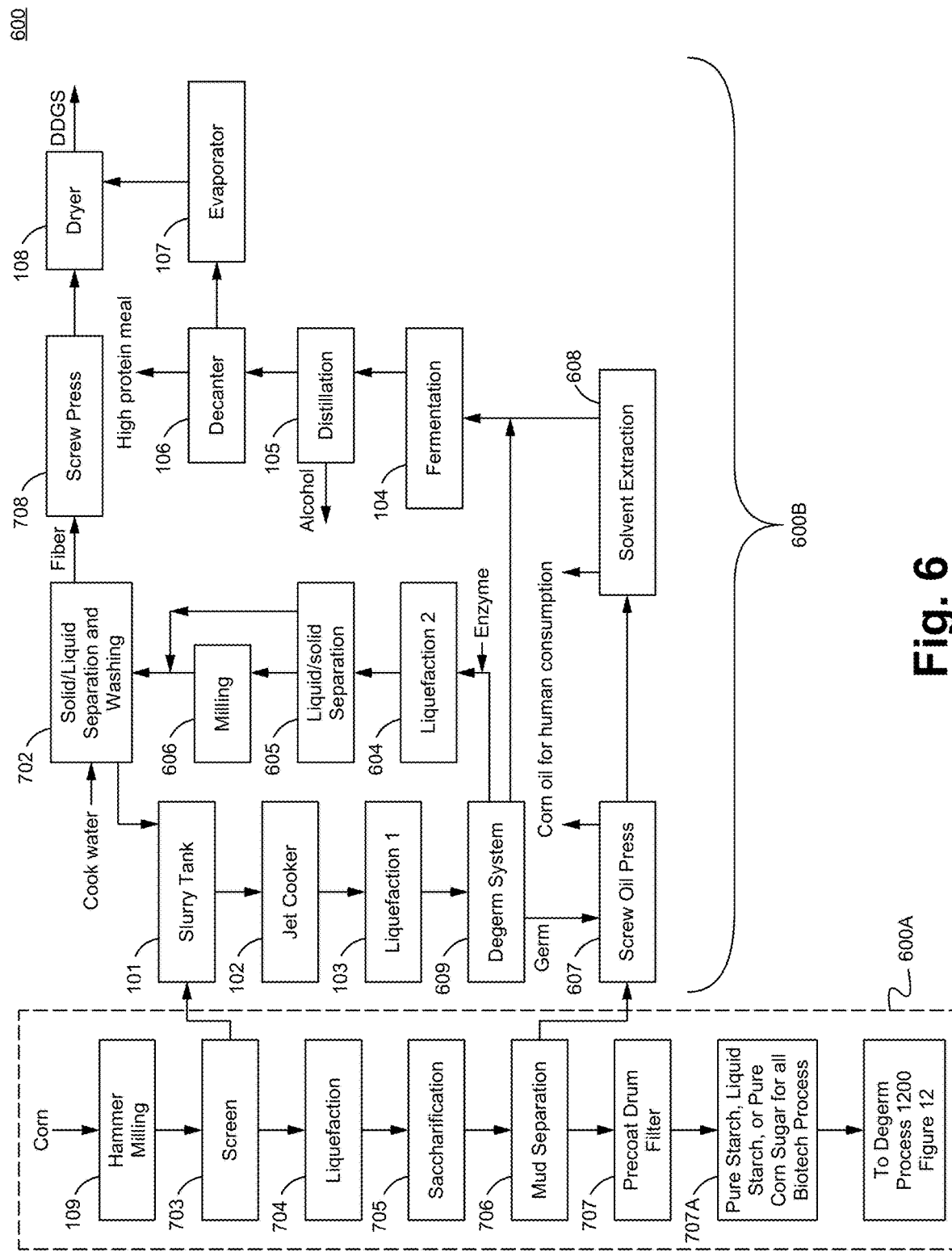
FIG. 6 illustrates an improved dry mill process to produce pure starch for biotech processes and separate fiber and germ before fermentation in accordance with some embodiments.

2) The Process 600 of FIG. 6: An Improved Dry Mill Process with Removal of Fiber and Germ Before Fermentation The corn flour, after hammer mill at the Step 109, is sent to screen size separation at the Step 703, to separate fine solid particles (mainly starch from the floury endosperm) from coarse solids (mainly germ, grit, and fiber). The fine solid portion proceeds to liquefication at the Step 704 and Saccharification at the Step 705 to produce corn syrup. It is then sent to mud centrifuge at the Step 706 to separate any oil/germ as light phase mud. The light mud receives precoat drum filter at the Step 707 to remove any fine solids and produce clean, pure corn syrup for biotech processes.

Figure 12:
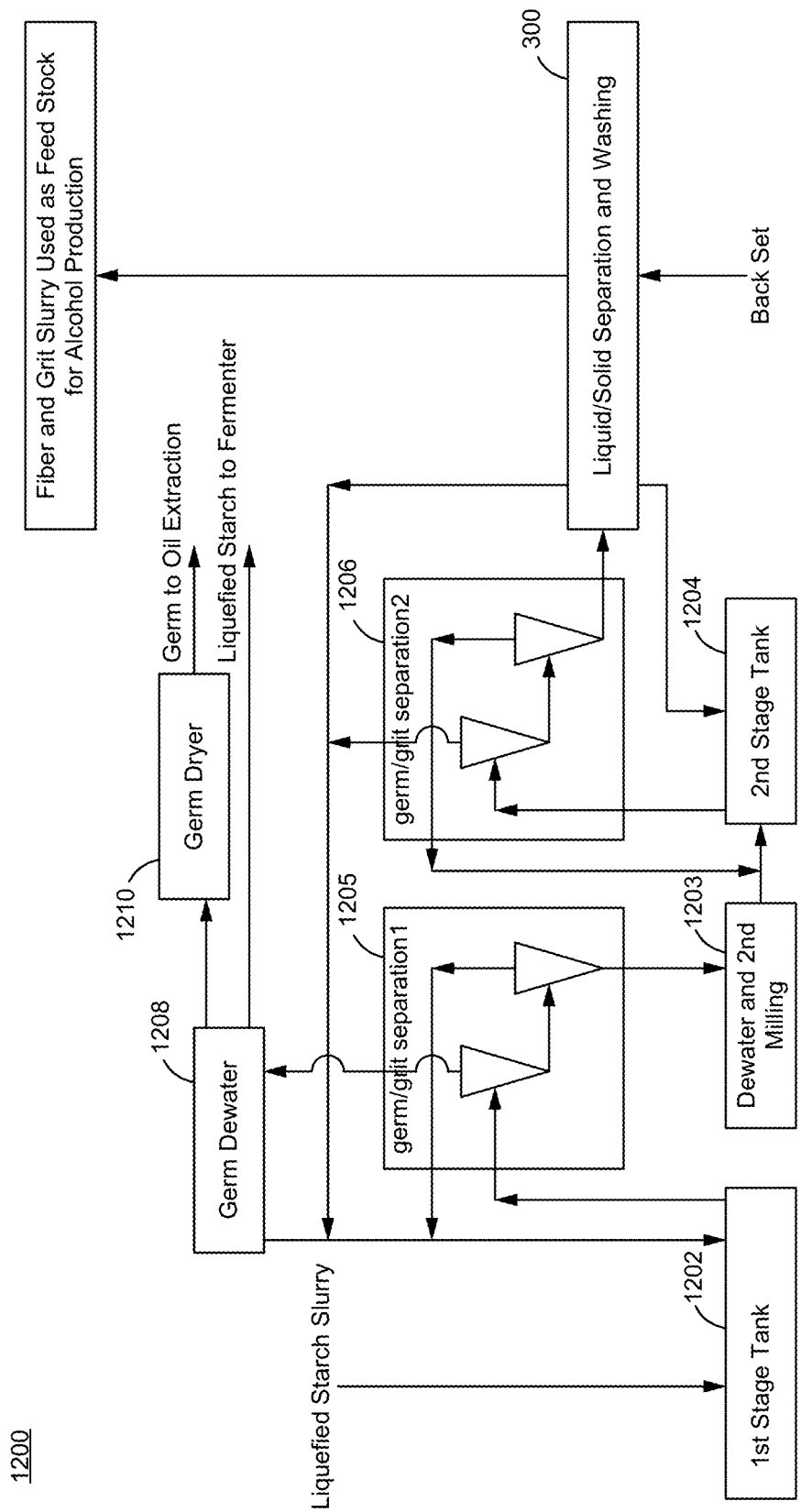
FIG. 12 illustrates a two stage dual germ cyclone process to recover germ after liquefication in improved dry mill process in accordance with some embodiments.

The larger solid particles from screen separation at the Step 703 are sent to slurry tank at the Step 101, with filtrate from liquid/solid separation at the Step 701 used as cook water to start liquefication. Jet cooker at the Step 102 and liquefication 1 at the Step 103 are used to liquefy a majority of the starch at higher temperatures (above 110° C.) and higher Be slurry. The high Be liquefied starch slurry with grit, germ and fiber is sent to degerm at the Step 609 (as shown in FIG. 12) to separate germ from grit and fiber by density difference, using liquefied starch slurry as the liquid media. A two-stage dual germ cyclone can be used for this degerm process. A 9 inch cyclone can be followed by an 8 inch or 6 inch cyclone A cyclone, followed by a 6 inch B cyclone, as is commonly used in the industry.

Process 1200 of the FIG. 12: The liquefied starch slurry with germ, grit and fiber particles are pumped to a first set of dual germ cyclones at the Step 1205, to separate germ from grit and fiber by density differential. The germ particles lighter than the liquefied starch slurry will come off as the light phase from the top of the first germ cyclone. The germ is then washed and dewatered at the Step 1208 to produce germ for production of corn oil.

The grit and fiber particles heavier than the liquefied starch slurry comes off the bottom of second set dual germ cyclone at the Step 1206. The grit and fiber are then subjected to $2^{nd}$ milling at the Step 1203 to break up the grit (horny endosperm) to release more starch. The milled grit and fiber are then sent to the $2^{nd}$ stage tank at the Step 1204. The heavy liquefied starch slurry with broken grit from the $2^{nd}$ stage tank at the Step 1204 is fed to $2^{nd}$ set dual germ cyclone at the Step 1206. The light phase from first degerm cyclone contains the liquefied starch slurry with any germ particles not recovered from first set dual germ cyclone, and is recycled back to first stage tank. The heavy phase from the bottom of the second germ cyclone is discharged to liquid/solid separation at the process 300 (new three section paddle screen) to separate fine particles (less than 50 micron) starch and gluten from larger particles (grit and fiber). The fine particle stream with liquefied starch is recycled back to second stage tank at the Step 1204. The back-set stream used as wash water in the three-section paddle screen is used to wash off the liquefied starch from the grit and fiber particles in the $2^{nd}$ and $3^{rd}$ screen sections. The wash liquid is recycled back to first stage tank at the Step 1202.

The washed grit and fiber particles from the three-section paddle screen at the process 300 is sent to low Be liquefication 2 at the Step 604 to continue soaking/cooking to soften the grit. The degerm operation can occur after high Be liquefication 1 at the Step 103 of FIG. 6 or between high Be liquefication 1 at the Step 103 and low Be liquefication 2 at the Step 604, or after low Be liquefication 2 at the Step 604.

The softened grit from liquefication 2 at the Step 604 with low Be liquefied starch slurry fed to liquid/solid separation at the Step 605 to dewater, followed by milling at the Step 606 to break up the grit particles to release more starch. The slurry is then sent to liquid/solid separation and washing at the Step 702 to produce pure fiber as feed stock for secondary alcohol production and paper industry use or sent to screen press at the Step 708 for dewatering. It is then mixed with syrup from evaporator at the Step 107 and sent to dryer at the Step 108 to produce low protein DDGS for cow feed.

The whole stillage after fermentation at the Step 104 and distillation at the Step 105 is sent to decanter at the Step 106 to recover high protein meal. The germ from degerm process 1200 at the Step 609 of the FIG. 6 can further extract oil by combining screw press at the Step 607 and solvent extraction at the Step 608. The oil quality is better (light in color and low in free fatty acid). The oil yield can be as high as 1.6 lb/Bu, but the germ protein denatures by the high temperatures (over 1000F) used with this oil extraction, leading to a product with less nutritional value. Ethanol can be used as a solvent and an extremely high shear device such as a Supraton can be used to break the oil cell protein wall to produce good quality oil with high oil yield (up to 1.4 lb/bu) plus high value germ protein meal for fish farms.

Figure 8:
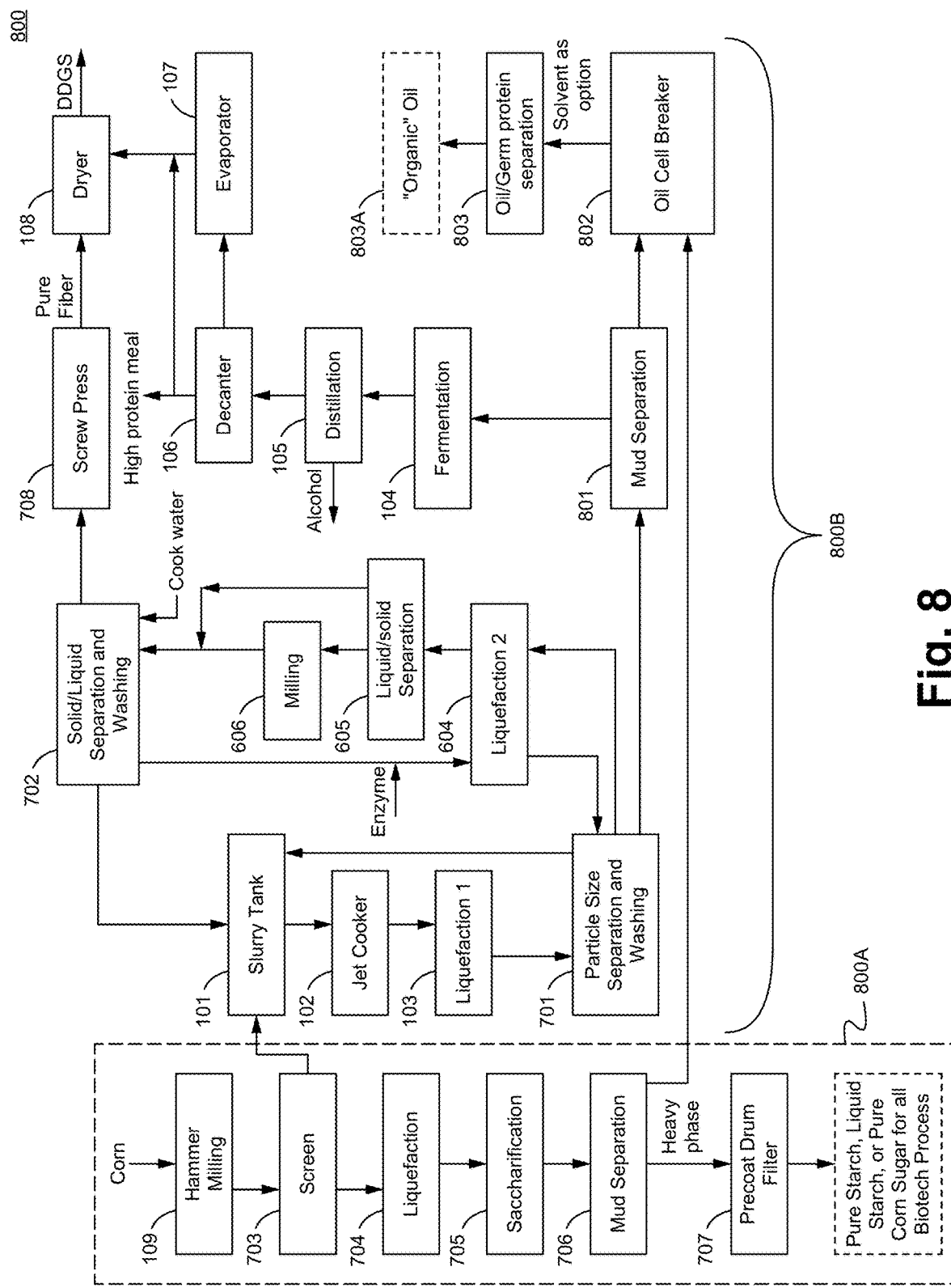
FIG. 8 illustrates an improved dry mill process to produce pure starch for biotech processes and produce pure fiber and "organic oil" before fermentation in accordance with some embodiments.

3) The process 800 of FIG. 8 illustrates an improved dry mill process with removal of fiber and organic oil before fermentation at the Step 104 in accordance with some embodiments.

The corn flour, after hammer mill at the Step 109, is sent to screen size separation at the Step 703, to separate fine solids (mainly starch from the floury endosperm) from the coarse solids (mainly germ, grit and fiber). The fine solids portion is sent to liquefication at the Step 704 and Saccharification at the Step 705 to produce corn syrup, then sent to mud centrifuge at the Step 706 to separate any oil/germ as a light(mud) phase. Next is precoat drum filter at the Step 707 to remove any fine solids to produce clean pure corn syrup for biotech processes. The larger solid particles from screen separation at the Step 703 are sent to slurry tank at the Step 101 with filtrate from liquid/solid separation at the Step 702 as cook water to start the liquefication steps by following jet cooker at the Step 102 and liquefication 1 at the Step 103 to liquefy the majority of the starch at higher temperatures (above 110° C.) and higher Be slurry.

The high Be liquefied starch slurry with grit, germ and fiber particles is sent to liquid/solid separation and washing at the Step 701. The new three section paddle screen with small screen opening (e.g., 100 microns (can be 50 to 400 micron)) is used to separate and wash any larger solid particles (grit, germ, and fiber) to low Be liquefication 2 at the Step 604. Further soaking/cooking grit, germ and fiber particles will become softer and easier to break up. The grit and germ particles, after soak/cooking in liquefication 2 at the Step 604, are sent to liquid/solid separation at the Step 605 for dewatering. Next comes milling at the Step 606 to further break up the grit and germ particles to release starch and oil. The broken germ and grit particles are sent to other liquid solid separation and washing at the Step 702 to produce pure fiber for secondary alcohol production or paper industry use or further dewatering by screw press at the Step 708. Then, it is mixed with syrup from evaporator at the Step 107 to produce low profat DDGS after dryer at the Step 108. The cook water is used to wash the liquefied starch off the fiber in the $2^{nd}$ and $3^{rd}$ screen sections in the three section paddle screens apparatus before coming out as wet fiber cake.

The filtrate from the $2^{nd}$ and $3^{rd}$ section screen are recycled back to liquefication 2 at the Step 604. The filtrate from $1^{st}$ section screen with small germ and grit particles are sent to slurry tank at the Step 101. The high Be liquefied starch (filtrate from first section paddle screen at the Step 701) is sent to mud centrifuge at the Step 801 to remove mud (oil/germ/protein phase) before being sent to fermentation.

The whole stillage after fermentation at the Step 104 and distillation at the Step 105 is sent to decanter at the Step 106 to produce high protein cake for animal feed and a portion is mixed with fiber to form high protein WDGS or DDGS. The overflow from decanter at the Step 106 is sent to evaporator at the Step 107 to concentrate to 30 to 35% DS syrup and mixed with fiber from screw press at the Step 708 to produce DDGS. The overflow from decanter at the Step 106 is back set.

The mud phase from both mud centrifuge at the Step 801 and at the Step 706 is sent to high shear milling device at the Step 802 such as a Supraton to further break the oil cell wall inside the germ to release more oil. The breaking of the germ (germ protein) and oil are fed to a three-phase decanter at the Step 803 to do oil/germ protein separation and produce "organic" oil as a light phase for human consumption. The germ protein, as the heavy phase from decanter is sent to fermentation at the Step 104. A nontoxic solvent such hexane, butanol even ethanol can be added to decanter at the Step 803 to increase oil yield, but this increases the need for more equipment (solvent recovery system.) cost. If ethanol is used, the solvent recovery system can be part of distillation to save equipment cost and operation cost as well.

Figure 9:
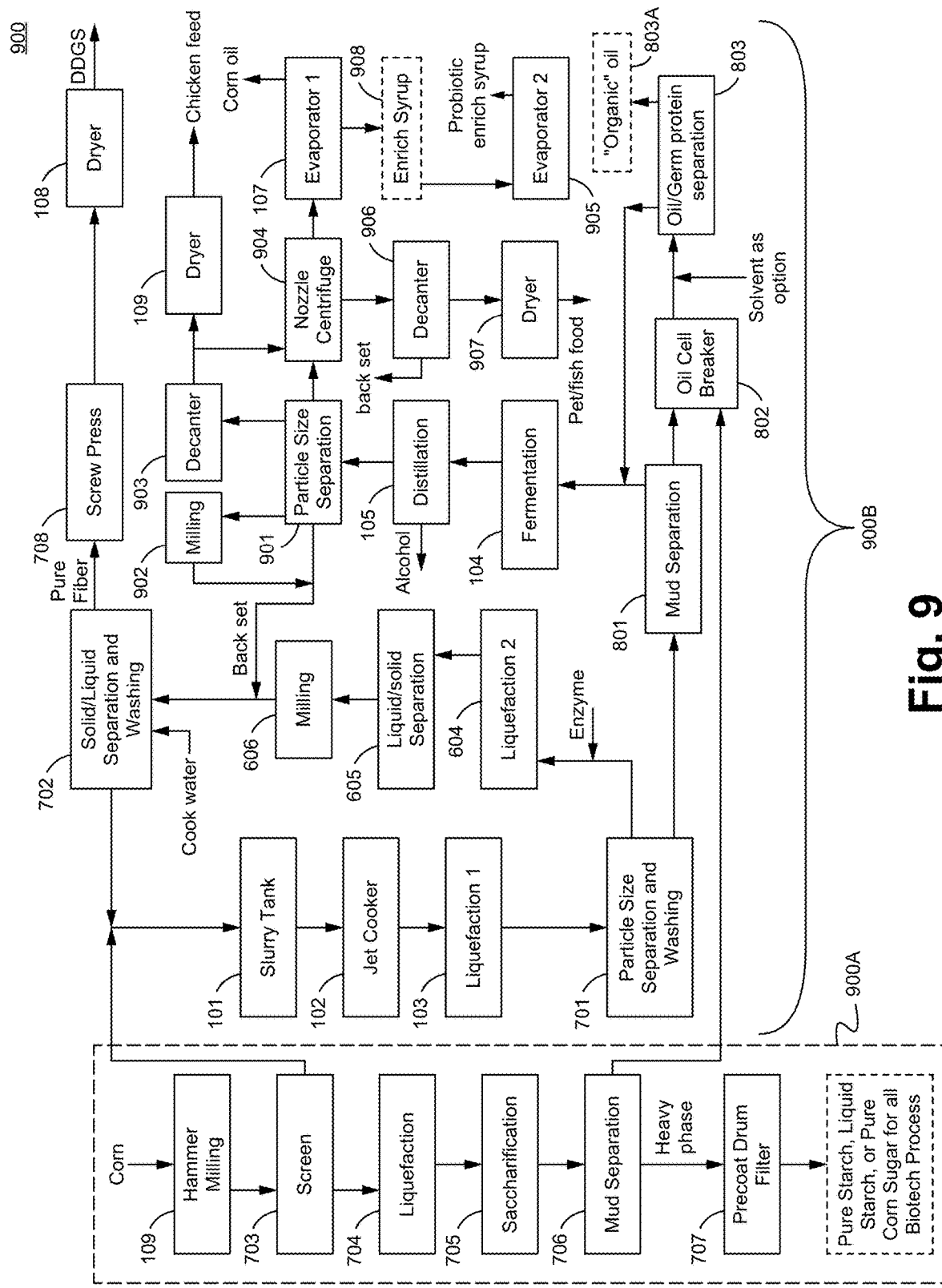
FIG. 9 illustrates an improved dry mill process to produce pure starch for biotech processes and produce pure fiber and "organic oil" before fermentation and animal feeds after fermentation in accordance with some embodiments.

4) The process 900 of FIG. 9 illustrates an improved dry mill process produce pure corn syrup for biotech processes as well as remove pure fiber and organic oil produced before fermentation and produce valuable animal feed products from the post fermentation process in accordance with some embodiments.

After the hammer mill at the Step 109, the corn flour is fed to screen size separation at the Step 703 to separate fine solids, mainly the starch of the floury endosperm, from the coarse solids, which are mainly germ, grit, and fiber.

The fine solid portion is sent through liquefication at the Step 704 and Saccharification at the Step 705 to produce corn syrup. It is then sent to mud centrifuge at the Step 706 to separate oil in the germ as the light (mud) phase, followed by precoat drum filter at the Step 707 to remove any fine solids and produce clean pure corn syrup, which can be used for biotech processes. The larger solid particles from screen separation at the Step 703 are sent to slurry tank at the Step 101 with filtrate from liquid/solid separation at the Step 702 used as cook water to start the liquefication step, followed by jet cooker at the Step 102 and liquefication 1 at the Step 103 to liquefy a majority of the starch at higher temperatures (above 110° C.) and higher Be slurry. The high Be liquefied starch slurry with grit, germ and fiber particles is sent to liquid/solid separation and washing at the Step 701. The three-section paddle screen with small screen openings, e.g., 100 microns (can be 50 to 400 micron) separates and washes any larger solid particles (e.g., grit, germ and fiber) from low Be liquefication 2 at the Step 604. The separated grit, germ and fiber particles are subjected to further soaking and cooking to become softer and easier to break up. The grit and germ particles, after soaking and cooking in liquefication 2 at the Step 604 are sent to liquid/solid separation at the Step 605 for dewatering, then to milling at the Step 606 to further break up the grit and germ particles to release starch and oil.

The broken-up germ and grit particles are sent to liquid/solid separation and washing at the Step 702 to produce pure fiber for secondary alcohol production or for the paper industry. They can be subjected to further dewatering by screw press at the Step 708 to produce low profat DDGS after dryer at the Step 108.

The cook water can be used to wash liquefied starch off the fiber in the $2^{nd}$ and $3^{rd}$ screen sections of the three section paddle screens, before exiting as wet fiber cake. The filtrate from $2^{nd}$ and $3^{rd}$ screen sections are recycled back to liquefication 2 at the Step 604. The filtrate from the 1st screen section with small germ and grit particles is sent to slurry tank at the Step 101. The high Be liquefied starch as filtrate from first section paddle screen at the Step 701 is sent to mud centrifuge at the Step 801 to remove mud (oil/germ/protein phase) before sent to ferment.

The mud phase from both mud centrifuge at the Steps 801 and 706 are sent to high shear milling device at the Step 802 such as a Supraton to further break the oil cell wall inside germ particles to release more oil. The broken germ particles containing germ protein and oil are fed to two/three phase decanter at the Step 803 to perform an oil/germ protein separation and produce "organic" oil as a light phase for human consumption. The germ protein, as the heavy phase from decanter at the Step 803, is sent to fermentation at the Step 104. A non-toxic solvent such an hexane, butanol or ethanol can be added to decanter at the Step 803 to increase oil yield. However, this increases the need for more equipment (solvent recovery system.) and increases cost. If ethanol is used, the solvent recovery system can be part of the distillation process to save equipment costs.

The whole stillage, after fermentation at the Step 104 and distillation at the Step 105 is sent to liquid/solid separation at the Step 901 to separate any larger grit and germ particles and dewater the slurry before being sent to milling at the Step 902. The further broken up germ and grit particles from both milling at the Step 606 and 902, plus the back set stream, are sent to liquid/solid separation at the Step 702 and to a washing step and recycled back to slurry tank at the Step 101 for increased oil and alcohol yield. The filtrate from liquid/solid separation at the Step 901 is sent to decanter at the Step 903 to produce high protein meal wet cake, followed by dryer at the Step 109 to produce gluten meal for chicken and pig feed. The overflow from decanter at the Step 903 is sent to nozzle centrifuge at the Step 904 to separate an oil rich stream as the light phase and a protein rich stream as the heavy phase. The protein rich heavy phase is sent to protein decanter at the Step 906 to produce high value yeast/germ protein wet cake follow by ring dryer at the Step 907 to produce high value HP50 protein meal for household pet food and fish farm food. The overflow from decanter at the Step 906 is back set. The oil rich light phase from nozzle centrifuge at the Step 904 is sent to evaporator 1 at the Step 107 to concentrate the liquid to 30 to 35% DS syrup. To recover the oil, this 30% DS syrup is sent to enrich syrup at the Step 908 to convert resident sugar to lactic acid by addition of lactic acid producing probiotic cultures, such as *Lactobacillus plantarum* ZJ316, *Lactobacillus amylovorus*, *Lactobacillus fermentum*, or *Lactobacillus mucosae*. This secondary fermentation produces up to 20% (in DB) lactic acid and $10^9$ CFU probiotic unit.

This enriched syrup can be concentrated up to 85% DS syrup by low temperature vacuum evaporator 2 at the Step 905 to avoid high temperatures that can destroy the nutritional value inside the syrup. Alternatively, a waste heat recovery system (not shown) can be used to recover waste heat from the dryer to help evaporate the syrup to 85% DS. This high concentration syrup also can by-pass the dryer and be added to super dry feed to maintain 10% moisture in the feed products. This 85% DS enriched syrup also can used as an animal food supplement or part of baby animal milk or as a bonding agent in production of probiotic pellet feed. The syrup can be added to animal drinking water formula.

The above improved dry mill processes are examples of many possible ways to use the larger grit, germ, and fiber particles as feed stock to produce alcohol and some by-products for animals feed. The selection of the specific process depends on the quality and quantity of pure starch needed plus the required alcohol yield and quality and the quality of the byproducts.

Many particle size reducer devices can used for milling at the Steps 606 and 902, such as a grind mill (some shear force and some cutting); a roller mill (low energy and no cutting); a pin mill (no cutting, but impact force to break the particles); or a Supraton (highly intensive shear milling). The choice will depend on the quality and quantity of byproducts desired, plus the alcohol yield desired.

The three-section paddle screen with high rate washing should be used for liquid/solid separation at the Step 605 and particle size separation and washing at the Steps 701, 702 and 901. The three sections of the screen can have different screen size openings, plus different screen designs and orientations (wedge wire slot opening vertical or parallel, round hole screen sheet, or wire screen etc.). Therefore, this device can be used for a very efficient solid classification by solid shape and size. For example, the device can separate fine fiber and germ particles with a wedge wire, with slot openings parallel to fluid flow, to receive the thin, long fiber particles. This device also gives extremely high rate of washing liquid/solid ratio >1; replacement washing plus ease in selecting where to position the source of washing liquid.

Figure 13:
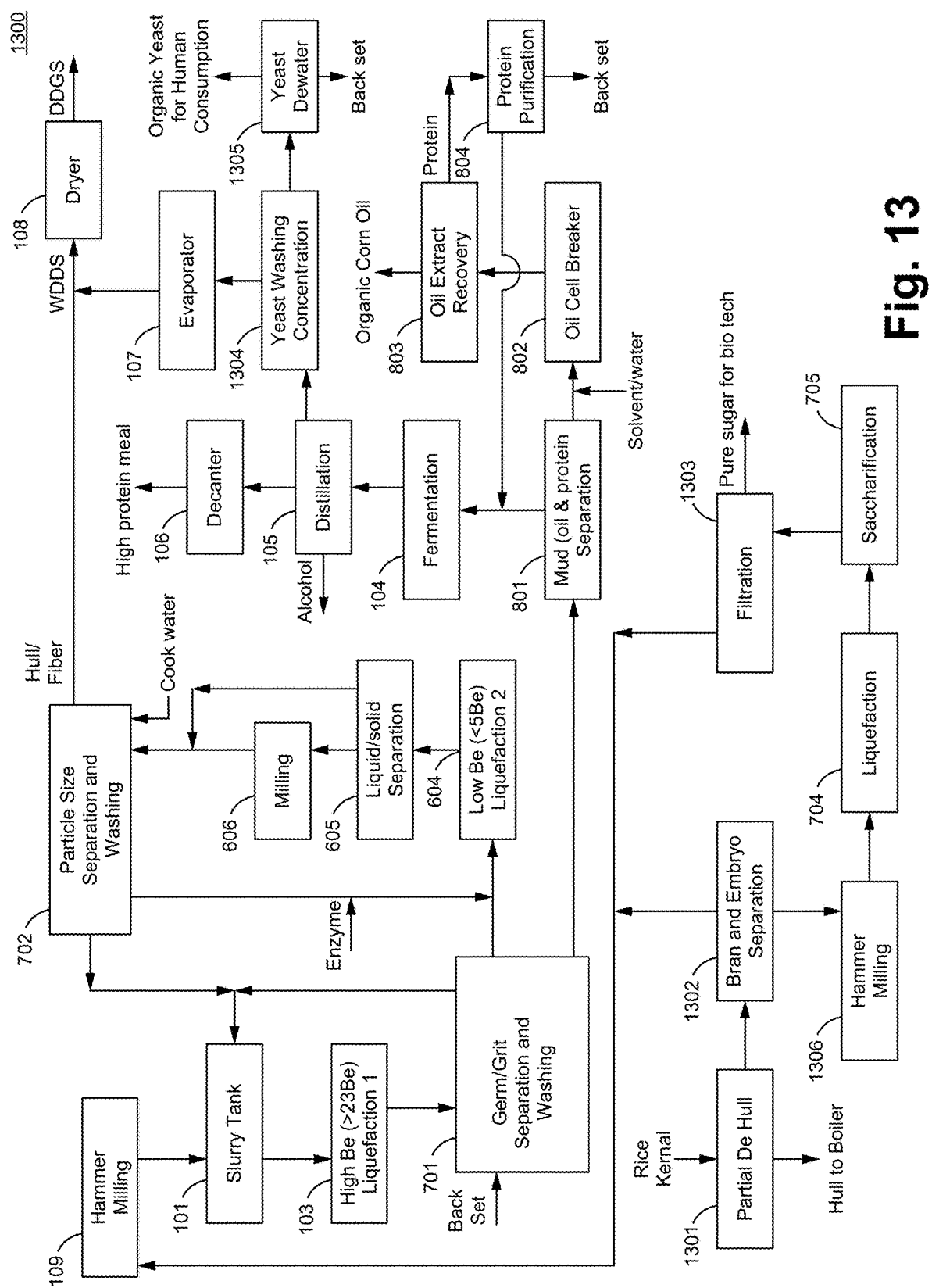
FIG. 13 illustrates a process for using partially dehulled brown rice to produce alcohol and pure starch for biotech processes, plus products including organic oil, rice protein and yeast protein for human consumption in accordance with some embodiments.

5) The process 1300 of FIG. 13 illustrates using partially dehulled brown rice to produce alcohol and pure starch, organic oil, rice protein and yeast protein for human consumption.

A feedstock of rice grains is fed to a partial dehulling at the Step 1301 to partially dehull the grains. The hull is not completely removed in this step. Some hull is ok to be left with the grain, which contains the starch. The removed hull is sent to a boiler as a fuel source.

The starch and remaining hull particles are sent to bran and embryo separation at the Step 1302 for bran and embryo separation. The bran and embryo are the protein and oil containing portions, respectively. To produce pure starch, the protein and oil containing portions need to be removed. The protein and oil free starch is sent to a hammermill at the Step 1306. The milled rice starch is then sent to the Step 704 for liquefaction, then the Step 705 for Saccharification, then the Step 1303 to remove the pure starch for biotech applications. The bran and embryo separated during at the Step 1302 are combined with fine fiber from the Step 1303 and sent to the Step 109 for milling. The rice flour, milled in hammer mill at the Step 109 is sent to slurry tank at the Step 101, and then liquefication at the Step 103. After at the Step 103 liquefaction 1, slurry is sent to the Step 701. Back set is also added to the Step 701.

The separated oil and protein containing portions are sent to mud centrifuge at the Step 801 to separate any oil/germ as a light (mud) phase, followed by precoat drum filter at the Step 802, to remove any fine solids.

The protein and oil containing particles are fed to two/three phase decanter at the Step 803 to separate the oil from the protein and produce "organic" oil as a light phase for human consumption. The germ protein comes off as the heavy phase from decanter at the Step 803 and is sent to protein purification at the Step 804. After the pure protein is removed, the liquid stream is sent to fermentation at the Step 104. After fermentation at the Step 104, the alcohol is sent to the Step 105 for distillation for alcohol recovery. The stillage from distillation is sent to a yeast concentration at the Step 1304. The concentrated yeast is dewatered at the Step 1305 for organic yeast recovery for human consumption. The rejected water is used as back set. A non-toxic solvent such a hexane, butanol, even ethanol, can optionally be fed to decanter at the Step 802 to increase oil yield, but more equipment is needed (solvent recovery system). If ethanol is used, the solvent recovery system can be part of the ethanol distillation process to save equipment and operating cost. This step can produce clean pure corn syrup for biotech processes. The larger solid particles from screen separation at the Step 701 are sent to slurry tank at the Step 101 with filtrate from liquid/solid separation at the Step 702. The high Be liquefied starch slurry with grit, germ and fiber particles is sent to liquid/solid separation and washing at the Step 701.

The three section paddle screen with small screen openings in the first section (e.g., 100 microns (can be 50 to 400 micron)) should be used to separate and wash any larger solid particles (grit, germ and fiber). These particles can be added to low Be liquefication 2 at the Step 604. Further soaking and cooking of the grit, germ and fiber particles cause them become more soft and easier to break up. The grit and germ particles, after soaking and cooking in liquefication 2 at the Step 604 are sent to liquid/solid separation at the Step 605 for dewatering, then to milling at the Step 606 to further break up the grit and germ particles to release starch and oil. This breakup of germ and grit particles is sent to other liquid solid separation and washing at the Step 702. The broken particles are combined with the stream after evaporator at the Step 107 and are sent to the dryer in at the Step 108 to produce DDDS. The cook water is used for washing the liquefied starch off the fiber in the $2^{nd}$ and $3^{rd}$ screen sections in the three section paddle screen device before coming out as wet fiber cake. The filtrate from the $2^{nd}$ and $3^{rd}$ screen sections is recycled back to liquefication 2 at the Step 604. The filtrate from the 1st screen section with small germ and grit particles is sent to slurry tank at the Step 101. The high Be liquefied starch as filtrate from the first section of the paddle screen at the Step 701 is sent to mud centrifuge at the Step 801 to remove mud (oil/germ/protein phase) before being sent to fermentation.

The mud phase from both mud centrifuge at the Steps 801 and 706 are sent to high shear milling device at the Step 802 such as a Supraton, to further break the oil cell wall inside the germ to release more oil. Above all described as in corn, this invention can apply to all type of grain such as sorghum, wheat, barley, millet and rice etc.

In operation, a corn is milled, separating by sizes, liquifying, saccharifying, separating mud phase, and filtering using a precoat drum to generate pure starch as a feedstock for biotech processes.

In utilization, the pure starch is further processed to be used in a biotech process as a raw material.

What is claimed is:

1. A process of producing purified starch or purified corn syrup obtained from a floury endosperm portion of each of corns as a feedstock for a biotech process in a dry mill plant comprising:
   a) producing corn flour by reducing a particle size of a corn feedstock using a particle size reduction device;
   b) screening and separating the corn flour into a small particle portion and a larger particle portion, wherein the small particle portion contains free starch from the floury endosperm portion of each of the corns, wherein more than half of particles of the small particle portion have sizes smaller than 250 microns;
   c) producing a high Be (>26Be) corn syrup by liquefying and saccharifying the small particle portion;
   d) removing a mud phase from the high Be corn syrup by using a mud centrifuge, wherein the mud phase containing a mixture of oil, germ, protein and fiber; and
   e) removing solids by using a precoat drum filtration to produce a corn syrup or the purified starch for biotech processes having less than 0.35% by weight of protein in the corn syrup or the purified starch.

2. The process of claim 1, wherein the particle size reduction device comprises a hammer mill.

3. The process of claim 1, wherein the larger particle portion comprises germ pericarp and tip cap from a horny endosperm.

4. The process of claim 1, further comprising processing the larger particle portion through a high Be (>26Be) liquefication tank and a low Be (<5Be) liquefication tank.

5. The process of claim 4, wherein the high Be liquefication tank provides a preselected amount of liquefied starch to produce a predetermined alcohol concentration in a beer.

6. The process of claim 4, further providing germ and grit particles from a horny endosperm to be soaked and cooked in a low Be slurry in the low Be liquefication tank, so that the germ and the grit particles become soften germ and grit particles and easier to break-up to release low Be liquefied starch and oil.

7. The process of claim 6, further comprising sending the low Be liquefied starch with the soften germ and the grit particles to a second particle size reduction device to break up and release more starch and oil forming a second low Be liquefied starch slurry.

8. The process of claim 1, further comprising recovering germs in the liquefying using a liquefied starch slurry as a liquid media to separate a lighter phase germ, having grit, from a heavier phase, having fiber, through density differential in a two stage dual germ cyclone separation system.

9. The process of claim 1, wherein separating the small particle portion from the larger particle portion uses a screen size in a range between 50 microns and 500 microns.

10. The process of claim 1, wherein the small particle portion is less than 30% by weight of a total corn flour from the particle size reduction device.

11. A process of producing purified starch or purified corn syrup from a floury endosperm portion of each of corns as a feedstock for a biotech process in a dry mill plant comprising:
   a) producing corn flour by reducing a particle size of a corn feedstock using a first particle size reducer;
   b) screening and separating the corn flour into a first small particle portion and a first larger particle portion, wherein the first small particle portion contains free starch from the floury endosperm portion of a corn, and wherein more than half of the particles of the first larger particle portion have sizes greater than 500 microns;
   c) further reducing a particle of the first small particle portion through a second particle size reducer into a second small particle portion and a second larger particle portion;
   d) screening and separating the second small particle portion from the second larger particle portion;
   e) producing a high Be (>26Be) corn syrup by liquefying and saccharifying the second small particle portion;
   f) removing a mud phase from the high Be corn syrup by using a mud centrifuge, wherein the mud phase containing a mixture of oil, germ, protein and fiber; and
   g) removing solids by using a precoat drum filtration to produce a corn syrup or the purified starch for biotech processes having less than 3% by weight of protein in the corn syrup or the purified starch.

12. The process of claim 11, wherein the first particle size reducer comprises a hammer mill.

13. The process of claim 12, wherein the hammer mill has a screen size in a range between /4;64-inch holes and /12;63-inch holes.

14. The process of claim 11, wherein the second particle size reducer comprises a pin mill.

15. The process of claim 11, wherein the larger particle portion comprises germ pericarp and tip cap from the horny endosperm.

16. The process of claim 11, wherein the second small particle portion comprises a further refined freed starch from the first refined freed starch.

17. The process of claim 11, further comprising processing the larger particle portion through a high Be (>26Be) liquefication tank and a low Be (<5Be) liquefication tank.

18. The process of claim 17, wherein the high Be liquefication tank provides a selected amount of liquefied starch to produce a predetermined alcohol concentration in the beer.

19. A process of producing purified starch or purified corn syrup in a dry mill plant comprising:
   a) producing corn flour by reducing a particle size of a corn feedstock using a particle size reduction device;
   b) screening and separating the corn flour into a small particle portion and a larger particle portion; wherein the small particle portion contains free starch from floury endosperm portion of each of corns, and wherein more than half of the particles of the larger particle portion have sizes greater than 500 microns;
   c) using the larger particle portion to produce alcohol and one or more animal feed; and
   d) using the small particle portion to produce a purified starch or corn syrup, which contains processes of:
      i) liquefying and saccharifying the small particle portion, which forms a liquified and saccharified solution;
      ii) removing a mud phase from the liquified and saccharified solution forming a mud removed solution, wherein the mud phase contains a mixture of oil, germ, protein and fiber; and
      iii) removing solids by using a precoat drum filtration to produce a corn syrup or the purified starch for biotech processes having less than 3% by weight of protein in the corn syrup or the purified starch.

\* \* \* \* \*